US012641585B2

(12) United States Patent
Regev et al.

(10) Patent No.: US 12,641,585 B2
(45) Date of Patent: May 26, 2026

(54) COHERENCE BANDWIDTH SIGNALING FOR FREQUENCY DOMAIN IMBALANCE CORRECTION

(71) Applicant: QUALCOMM Incorporated, San Diego, CA (US)

(72) Inventors: Aviv Regev, Tel aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 18/449,533

(22) Filed: Aug. 14, 2023

(65) Prior Publication Data

US 2025/0063551 A1 Feb. 20, 2025

(51) Int. Cl.
*H04W 72/0453* (2023.01)

(52) U.S. Cl.
CPC .............................. *H04W 72/0453* (2013.01)

(58) Field of Classification Search
CPC ............... H04W 72/0453; H03D 3/009; H04L 27/0014; H04L 27/3863; H04L 27/364
See application file for complete search history.

(56) References Cited

U.S. PATENT DOCUMENTS

| | | | | |
|---|---|---|---|---|
| 10,644,927 B2 * | 5/2020 | Vergel | ................. | H04L 27/3863 |
| 2001/0050592 A1 * | 12/2001 | Wright | ................. | H03F 1/3294 |
| | | | | 330/149 |
| 2018/0167903 A1 * | 6/2018 | Fan | ..................... | H04L 25/0224 |
| 2020/0244509 A1 * | 7/2020 | Zhou | ................... | H04L 27/0014 |

OTHER PUBLICATIONS

International Search Report and Written Opinion—PCT/US2024/039610—ISA/EPO—Nov. 29, 2024.

* cited by examiner

*Primary Examiner* — Dady Chery
(74) *Attorney, Agent, or Firm* — QUALCOMM Incorporated

(57) ABSTRACT

Methods, systems, and devices for wireless communications are described. A user equipment (UE) may transmit a capability message indicating a capability of the UE to estimate a frequency domain imbalance between an in-phase portion of a transmission chain of a network entity and a quadrature-phase portion of the transmission chain of the network entity. The UE may receive, based on the capability message, an indication of a coherence bandwidth associated with the frequency domain imbalance. The coherence bandwidth may indicate a quantity of subcarriers (SCs) over which a characteristic of the frequency domain imbalance (e.g., a change in amplitude of the frequency domain imbalance) satisfies a threshold. The UE may perform an estimation of the frequency domain imbalance based on the coherence bandwidth. In some examples, the UE may receive downlink signals from a network entity and may perform a correction of the downlink signals based on the estimation.

26 Claims, 18 Drawing Sheets

115-b 105-b 105-c

Figure 4:
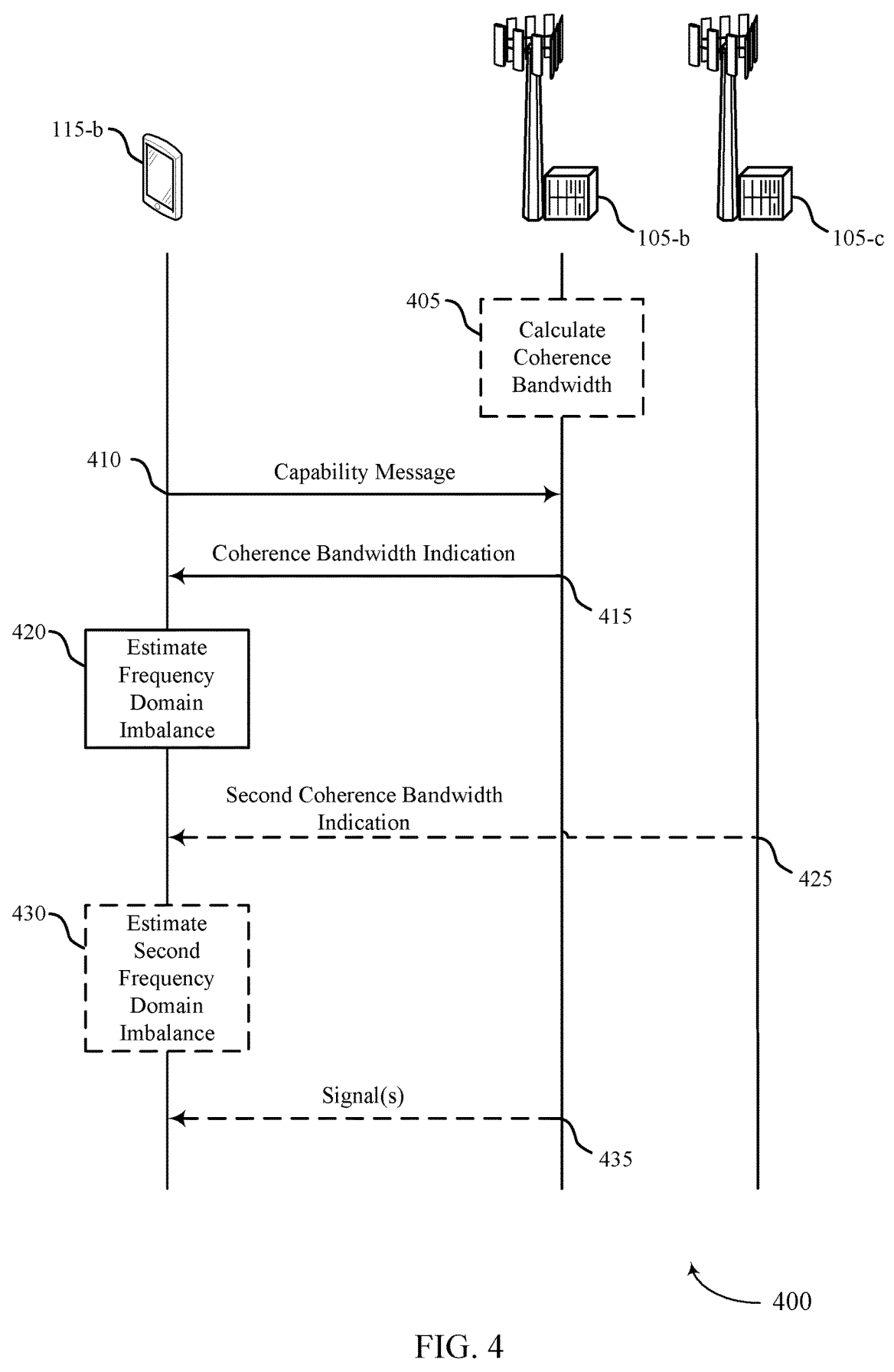

405 — Calculate Coherence Bandwidth

410 — Capability Message

Coherence Bandwidth Indication

415

420 — Estimate Frequency Domain Imbalance

Second Coherence Bandwidth Indication

425

430 — Estimate Second Frequency Domain Imbalance

Signal(s)

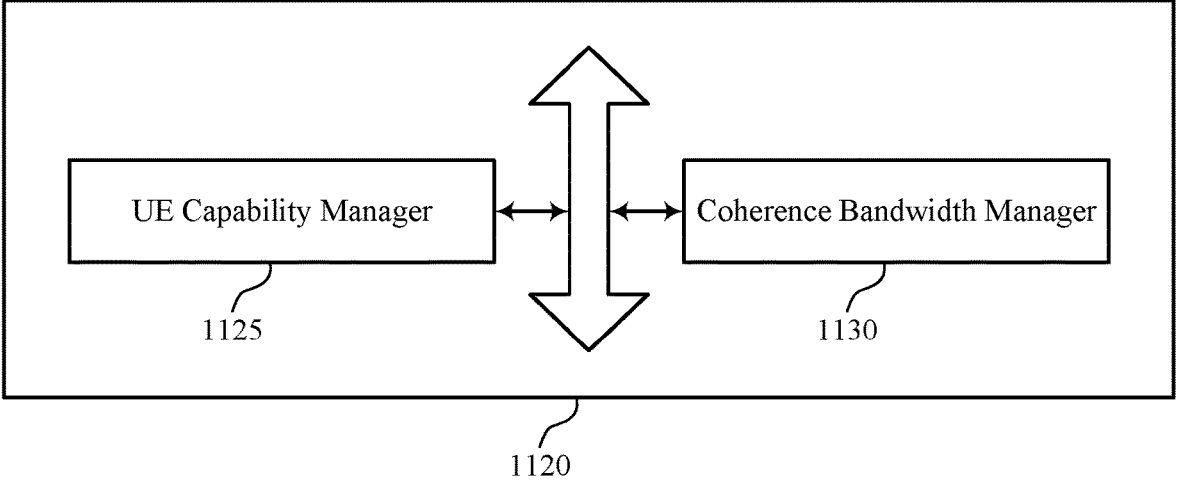
UE Capability Manager
1125
Coherence Bandwidth Manager
1130
1120
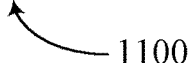
1100
FIG. 11

130

105

115

Network
Entity

Transceiver

1210

Antenna

1215

Communications
Manager

1220

Memory

Code

1230

1225

1240

Processor

1235

1205

1200

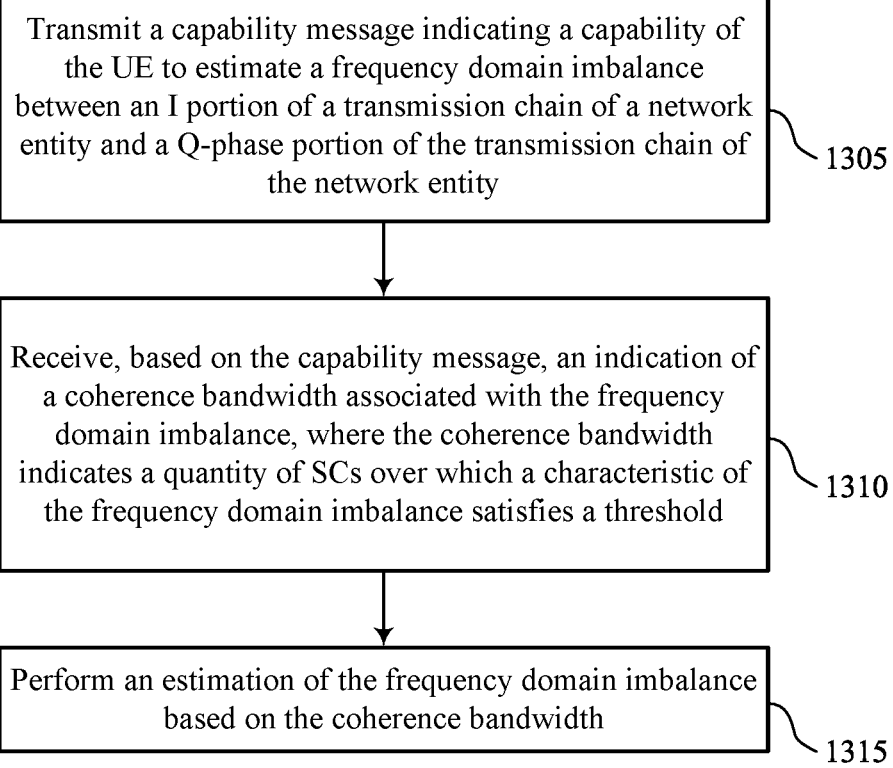

Transmit a capability message indicating a capability of the UE to estimate a frequency domain imbalance between an I portion of a transmission chain of a network entity and a Q-phase portion of the transmission chain of the network entity ⟍ 1305

Receive, based on the capability message, an indication of a coherence bandwidth associated with the frequency domain imbalance, where the coherence bandwidth indicates a quantity of SCs over which a characteristic of the frequency domain imbalance satisfies a threshold ⟍ 1310

Perform an estimation of the frequency domain imbalance based on the coherence bandwidth ⟍ 1315

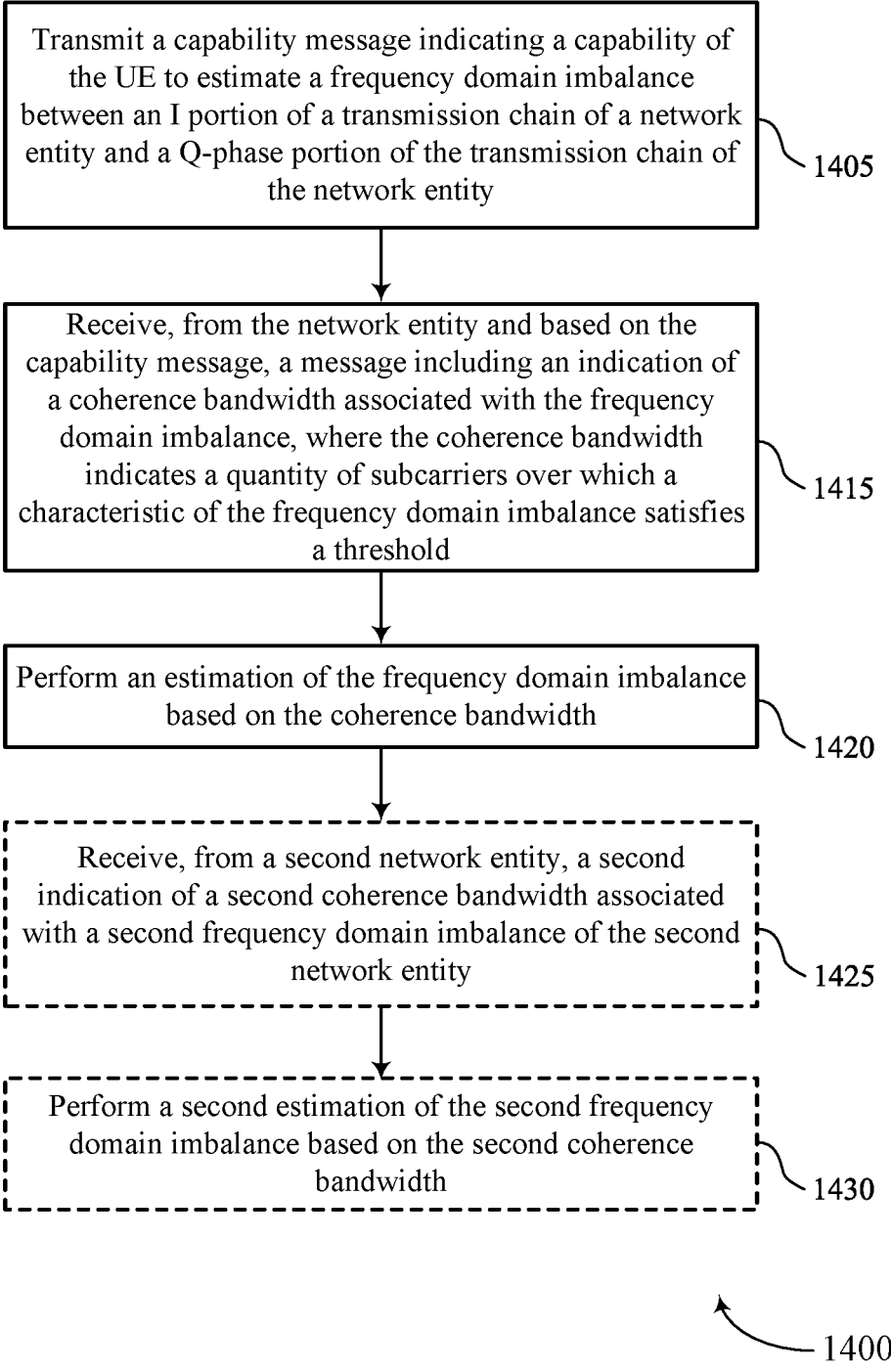

Transmit a capability message indicating a capability of the UE to estimate a frequency domain imbalance between an I portion of a transmission chain of a network entity and a Q-phase portion of the transmission chain of the network entity 1405

Receive, from the network entity and based on the capability message, a message including an indication of a coherence bandwidth associated with the frequency domain imbalance, where the coherence bandwidth indicates a quantity of subcarriers over which a characteristic of the frequency domain imbalance satisfies a threshold 1415

Perform an estimation of the frequency domain imbalance based on the coherence bandwidth 1420

Receive, from a second network entity, a second indication of a second coherence bandwidth associated with a second frequency domain imbalance of the second network entity 1425

Perform a second estimation of the second frequency domain imbalance based on the second coherence bandwidth 1430

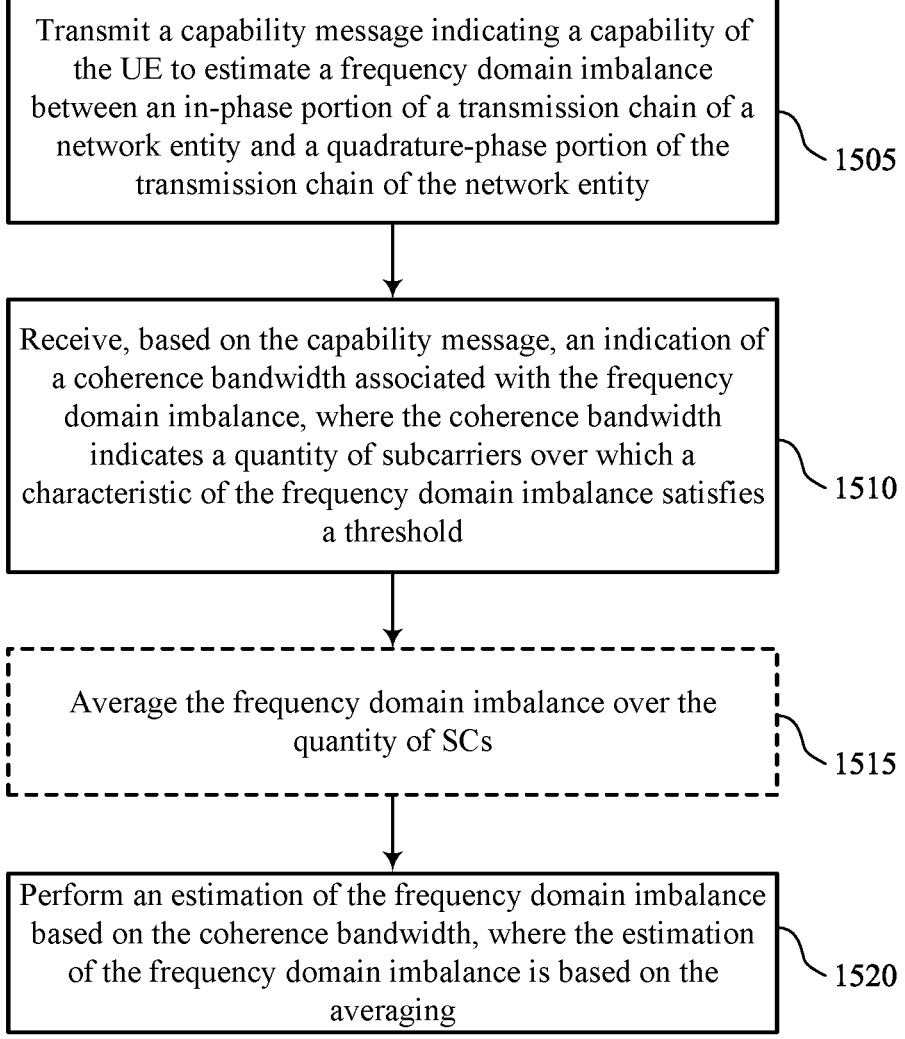

Transmit a capability message indicating a capability of the UE to estimate a frequency domain imbalance between an in-phase portion of a transmission chain of a network entity and a quadrature-phase portion of the transmission chain of the network entity

1505

Receive, based on the capability message, an indication of a coherence bandwidth associated with the frequency domain imbalance, where the coherence bandwidth indicates a quantity of subcarriers over which a characteristic of the frequency domain imbalance satisfies a threshold

1510

Average the frequency domain imbalance over the quantity of SCs

1515

Perform an estimation of the frequency domain imbalance based on the coherence bandwidth, where the estimation of the frequency domain imbalance is based on the averaging

Figure 16:
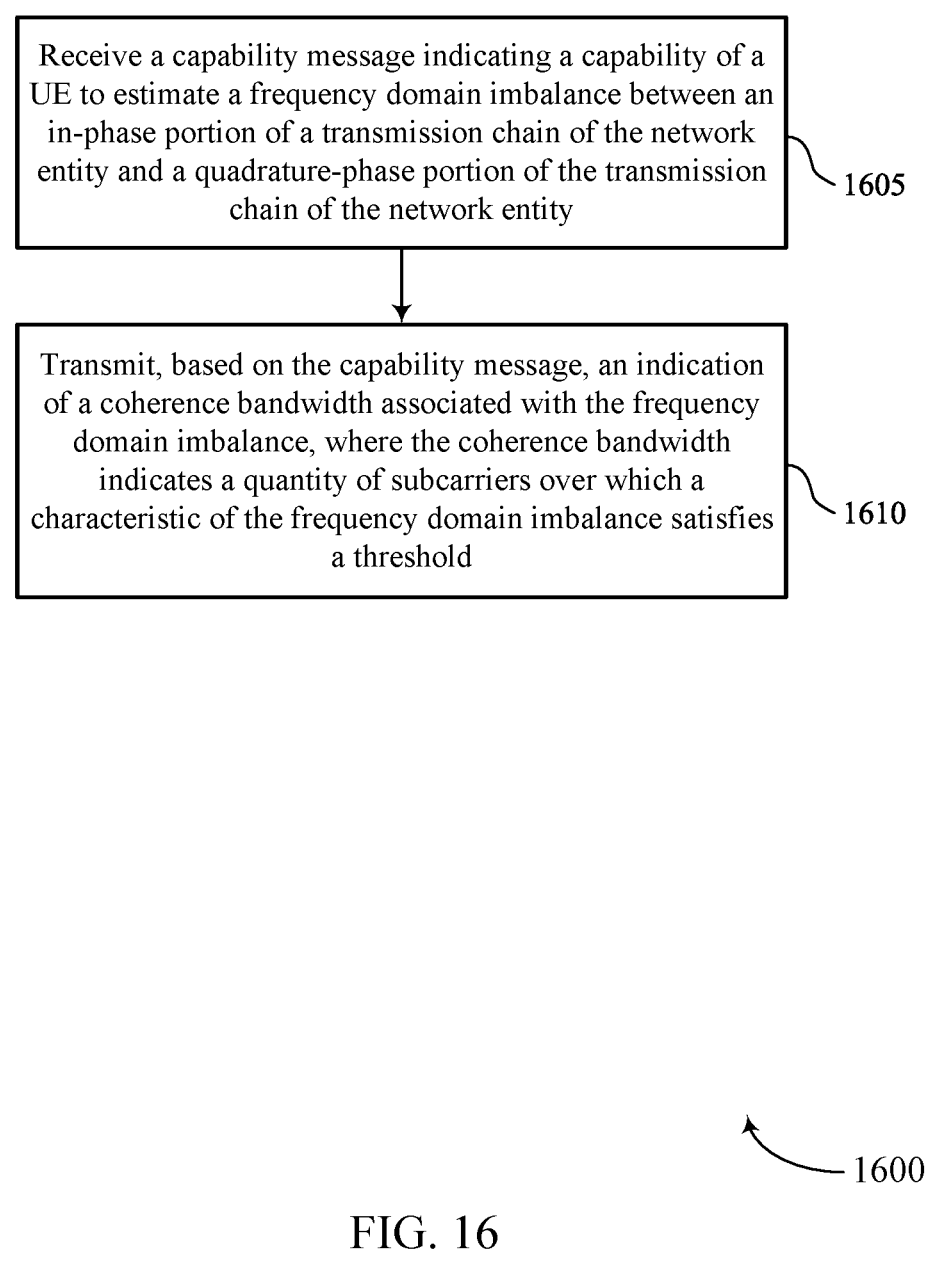

Receive a capability message indicating a capability of a UE to estimate a frequency domain imbalance between an in-phase portion of a transmission chain of the network entity and a quadrature-phase portion of the transmission chain of the network entity — 1605

Transmit, based on the capability message, an indication of a coherence bandwidth associated with the frequency domain imbalance, where the coherence bandwidth indicates a quantity of subcarriers over which a characteristic of the frequency domain imbalance satisfies a threshold — 1610

COHERENCE BANDWIDTH SIGNALING FOR FREQUENCY DOMAIN IMBALANCE CORRECTION

FIELD OF TECHNOLOGY

The following relates to wireless communications, including coherence bandwidth signaling for frequency domain imbalance correction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support coherence bandwidth signaling for frequency domain imbalance correction. For example, the described techniques provide for improved estimation of a frequency domain imbalance associated with wireless communications between a user equipment (UE) and a network entity. The network entity may indicate a coherence bandwidth associated with the frequency domain imbalance. The coherence bandwidth may indicate one or more characteristics of the frequency domain imbalance (e.g., with respect to a quantity of subcarriers (SCs) of the frequency domain imbalance). The UE may estimate the frequency domain imbalance for the network entity using the indicated coherence bandwidth.

A method for wireless communication by a UE is described. The method may include transmitting a capability message indicating a capability of the UE to estimate a frequency domain imbalance between an in-phase (I) portion of a transmission chain of a network entity and a quadrature-phase (Q) portion of the transmission chain of the network entity, receiving, based on the capability message, an indication of a coherence bandwidth associated with the frequency domain imbalance, where the coherence bandwidth indicates a quantity of SCs over which a characteristic of the frequency domain imbalance satisfies a threshold, and performing an estimation of the frequency domain imbalance based on the coherence bandwidth.

A UE for wireless communication is described. The UE may include one or more memories storing processor executable code, and one or more processors coupled with the one or more memories. The one or more processors may individually or collectively operable to execute the code to cause the UE to transmit a capability message indicating a capability of the UE to estimate a frequency domain imbalance between an I portion of a transmission chain of a network entity and a Q portion of the transmission chain of the network entity, receive, based on the capability message, an indication of a coherence bandwidth associated with the frequency domain imbalance, where the coherence bandwidth indicates a quantity of SCs over which a characteristic of the frequency domain imbalance satisfies a threshold, and perform an estimation of the frequency domain imbalance based on the coherence bandwidth.

Another UE for wireless communication is described. The UE may include means for transmitting a capability message indicating a capability of the UE to estimate a frequency domain imbalance between an I portion of a transmission chain of a network entity and a Q portion of the transmission chain of the network entity, means for receiving, based on the capability message, an indication of a coherence bandwidth associated with the frequency domain imbalance, where the coherence bandwidth indicates a quantity of SCs over which a characteristic of the frequency domain imbalance satisfies a threshold, and means for performing an estimation of the frequency domain imbalance based on the coherence bandwidth.

A non-transitory computer-readable medium storing code for wireless communication is described. The code may include instructions executable by one or more processors to transmit a capability message indicating a capability of the UE to estimate a frequency domain imbalance between an I portion of a transmission chain of a network entity and a Q portion of the transmission chain of the network entity, receive, based on the capability message, an indication of a coherence bandwidth associated with the frequency domain imbalance, where the coherence bandwidth indicates a quantity of SCs over which a characteristic of the frequency domain imbalance satisfies a threshold, and perform an estimation of the frequency domain imbalance based on the coherence bandwidth.

In some examples of the method, UEs, and non-transitory computer-readable medium described herein, receiving the indication of the coherence bandwidth may include operations, features, means, or instructions for receiving, from the network entity, a message including the indication of the coherence bandwidth.

Some examples of the method, UEs, and non-transitory computer-readable medium described herein may further include operations, features, means, or instructions for receiving, from a second network entity, a second indication of a second coherence bandwidth associated with a second frequency domain imbalance of the second network entity and performing a second estimation of the second frequency domain imbalance based on the second coherence bandwidth.

In some examples of the method, UEs, and non-transitory computer-readable medium described herein, receiving the message may include operations, features, means, or instructions for receiving the message via medium access control (MAC) layer signaling, radio resource control (RRC) layer signaling, or physical (PHY) layer signaling.

In some examples of the method, UEs, and non-transitory computer-readable medium described herein, performing the estimation of the frequency domain imbalance may include operations, features, means, or instructions for averaging the frequency domain imbalance over the quantity of SCs, where the estimation of the frequency domain imbalance may be based on the averaging.

In some examples of the method, UEs, and non-transitory computer-readable medium described herein, the characteristic includes a change in amplitude of the frequency domain imbalance and the coherence bandwidth indicates that the change in the amplitude of the frequency domain imbalance over the quantity of SCs may be below the threshold.

Some examples of the method, UEs, and non-transitory computer-readable medium described herein may further include operations, features, means, or instructions for receiving, from the network entity, one or more downlink signals and performing a correction of the one or more downlink signals based on the estimation of the frequency domain imbalance.

Some examples of the method, UEs, and non-transitory computer-readable medium described herein may further include operations, features, means, or instructions for receiving, from a network entity, a second indication to update the coherence bandwidth associated with the network entity, where the second indication includes an offset associated with the coherence bandwidth and performing a second estimation of the frequency domain imbalance based on the offset.

A method for wireless communication by a network entity is described. The method may include receiving a capability message indicating a capability of a UE to estimate a frequency domain imbalance between an I portion of a transmission chain of the network entity and a Q portion of the transmission chain of the network entity and transmitting, based on the capability message, an indication of a coherence bandwidth associated with the frequency domain imbalance, where the coherence bandwidth indicates a quantity of SCs over which a characteristic of the frequency domain imbalance satisfies a threshold.

A network entity for wireless communication is described. The network entity may include one or more memories storing processor executable code, and one or more processors coupled with the one or more memories. The one or more processors may individually or collectively operable to execute the code to cause the network entity to receive a capability message indicating a capability of a UE to estimate a frequency domain imbalance between an I portion of a transmission chain of the network entity and a Q portion of the transmission chain of the network entity and transmit, based on the capability message, an indication of a coherence bandwidth associated with the frequency domain imbalance, where the coherence bandwidth indicates a quantity of SCs over which a characteristic of the frequency domain imbalance satisfies a threshold.

Another network entity for wireless communication is described. The network entity may include means for receiving a capability message indicating a capability of a UE to estimate a frequency domain imbalance between an I portion of a transmission chain of the network entity and a Q portion of the transmission chain of the network entity and means for transmitting, based on the capability message, an indication of a coherence bandwidth associated with the frequency domain imbalance, where the coherence bandwidth indicates a quantity of SCs over which a characteristic of the frequency domain imbalance satisfies a threshold.

A non-transitory computer-readable medium storing code for wireless communication is described. The code may include instructions executable by one or more processors to receive a capability message indicating a capability of a UE to estimate a frequency domain imbalance between an I portion of a transmission chain of the network entity and a Q portion of the transmission chain of the network entity and transmit, based on the capability message, an indication of a coherence bandwidth associated with the frequency domain imbalance, where the coherence bandwidth indicates a quantity of SCs over which a characteristic of the frequency domain imbalance satisfies a threshold.

Some examples of the method, network entities, and non-transitory computer-readable medium described herein may further include operations, features, means, or instructions for performing one or more measurements associated with a change in amplitude of the frequency domain imbalance and calculating the coherence bandwidth based on the one or more measurements.

Some examples of the method, network entities, and non-transitory computer-readable medium described herein may further include operations, features, means, or instructions for performing one or more estimations of the frequency domain imbalance using a set of candidate coherence bandwidths that includes at least the coherence bandwidth and selecting the coherence bandwidth from among the set of candidate coherence bandwidths based on an estimated error associated with the coherence bandwidth.

In some examples of the method, network entities, and non-transitory computer-readable medium described herein, the estimated error may be lower than one or more estimated errors associated with one or more other coherence bandwidths of the set of candidate coherence bandwidths.

In some examples of the method, network entities, and non-transitory computer-readable medium described herein, transmitting the indication of the coherence bandwidth may include operations, features, means, or instructions for transmitting the indication via MAC layer signaling, RRC layer signaling, or PHY layer signaling.

In some examples of the method, network entities, and non-transitory computer-readable medium described herein, the indication of the coherence bandwidth further includes an identifier of the network entity.

In some examples of the method, network entities, and non-transitory computer-readable medium described herein, the characteristic includes a change in amplitude of the frequency domain imbalance and the coherence bandwidth indicates that the change in the amplitude of the frequency domain imbalance over the quantity of SCs may be below the threshold.

Some examples of the method, network entities, and non-transitory computer-readable medium described herein may further include operations, features, means, or instructions for transmitting a second indication to update the coherence bandwidth associated with the network entity, where the second indication includes an offset associated with the coherence bandwidth.

BRIEF DESCRIPTION OF THE DRAWINGS

FIG. 4 shows an example of a process flow that supports coherence bandwidth signaling for frequency domain imbalance correction in accordance with one or more aspects of the present disclosure.

FIG. 11 shows a block diagram of a communications manager that supports coherence bandwidth signaling for frequency domain imbalance correction in accordance with one or more aspects of the present disclosure.

FIGS. 13 through 17 show flowcharts illustrating methods that support coherence bandwidth signaling for frequency domain imbalance correction in accordance with one or more aspects of the present disclosure.

DETAILED DESCRIPTION

Figure 1:
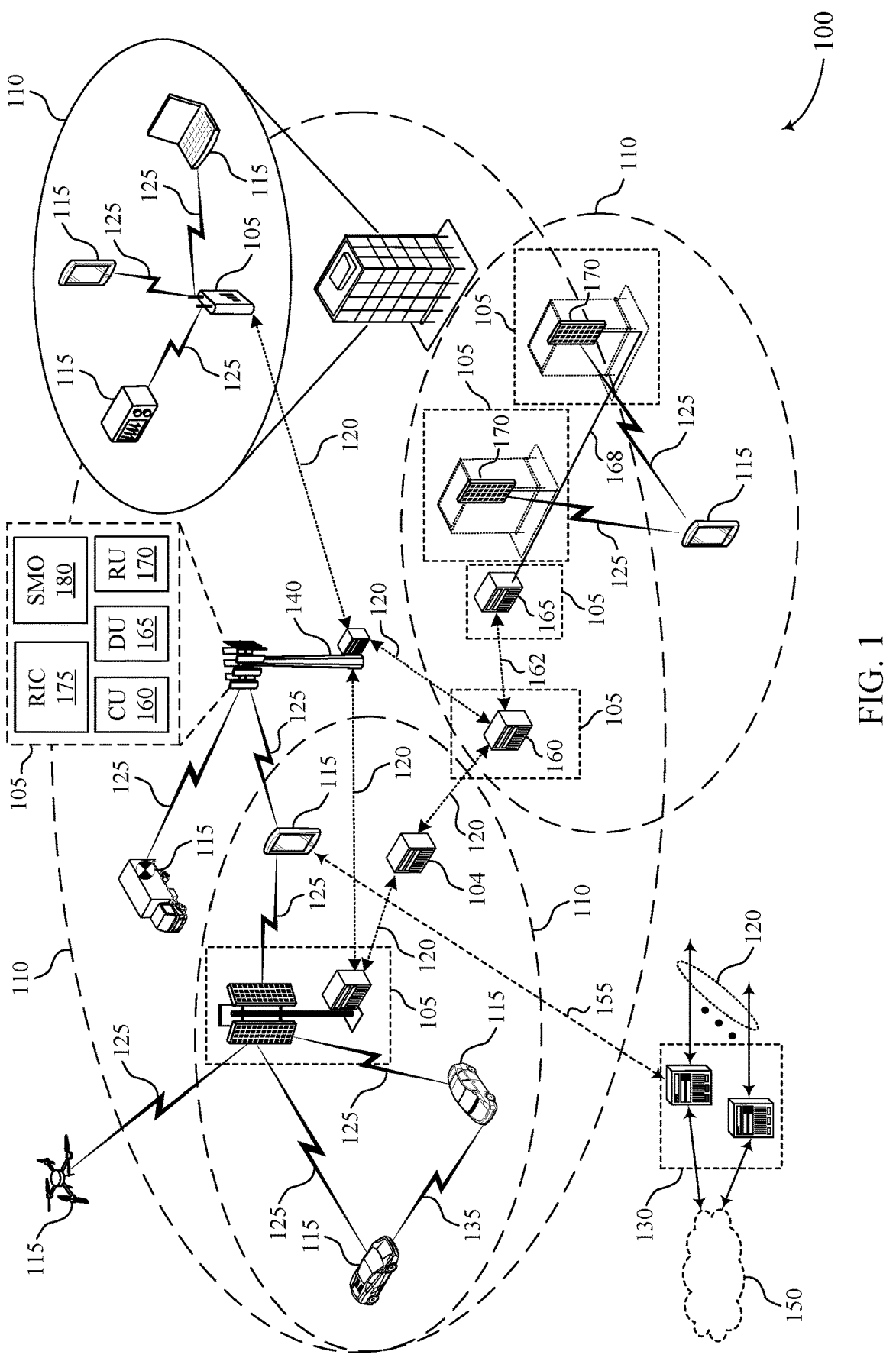
FIG. 1 shows an example of a wireless communications system that supports coherence bandwidth signaling for frequency domain imbalance correction in accordance with one or more aspects of the present disclosure.

Some network entities may employ a type of transmission modulator that may modulate an in-phase (I) portion of a signal and a quadrature phase (Q) portion of the signal. As such, the type of transmission modulator may be referred to as an IQ modulator. The IQ modulator may experience an impairment (e.g., an inherent impairment), which may result in imbalances, or errors, associated with signals that the network entity processes (e.g., outputs) using the IQ modulator. For example, for each signal the network entity inputs to the IQ modulator, the IQ modulator may cause an imbalance (e.g., mismatch, difference) between a gain of the I portion of the signal and a gain of the Q portion of the signal. Such an imbalance may be referred to as an IQ imbalance or an IQ mismatch. An IQ imbalance associated with one or more signals transmitted by the network entity may, in some cases, constrain (e.g., reduce) a link performance or a data transmission rate associated with the one or more signals. As such, a user equipment (UE) receiving the signals may estimate an IQ imbalance of the signals and perform one or more operations to compensate for (e.g., to correct or cancel) the IQ imbalance. The UE may perform a same IQ imbalance estimation irrespective of the network entity for which it is performing the estimation. For example, to estimate the IQ imbalance, the UE may average the IQ imbalance over a same (e.g., fixed) quantity of subcarriers (SCs). However, multiple network entities that communicate with the UE may each use respective IQ modulators (e.g., unique IQ modulators) for processing or transmission of signals, and signals output by the respective IQ modulators (e.g., and transmitted to the UE) may be associated with different IQ imbalances. As such, using the same quantity of SCs for estimating (e.g., as an averaging factor for estimating) the IQ imbalance for signals received from the multiple (e.g., different) network entities may lead to inaccurate IQ imbalance estimations at the UE.

In accordance with examples described herein, a network entity may indicate, to a UE, a coherence bandwidth of an IQ imbalance associated with the network entity, which may support increased accuracy of IQ imbalance estimation and correction at the UE. For example, the UE may indicate, to the network entity, a capability of the UE to estimate and cancel IQ imbalance. In response to the indication, the network entity may indicate a coherence bandwidth (e.g., a recommended coherence bandwidth, also referred to as a flatness factor) of the IQ imbalance of the network entity. The coherence bandwidth may correspond to a quantity of SCs over which a characteristic of the IQ imbalance satisfies a threshold. For example, a change in an amplitude of the IQ imbalance curve of the network entity may satisfy a threshold (e.g., may have a same or approximately the same value) across a quantity of SCs. In other words, the IQ imbalance curve may be flat or approximately flat across the quantity of SCs. In such an example, the coherence bandwidth may correspond to the quantity of SCs over which the amplitude of the IQ imbalance curve satisfies the threshold. The UE may perform an estimation (and one or more corrections) of the IQ imbalance based on the coherence bandwidth. That is, the UE may average of the IQ imbalance over the quantity of SCs indicated by the recommended coherence bandwidth. In some examples, the network entity may determine the coherence bandwidth prior to establishing communications with the UE (e.g., may determine the recommended coherence bandwidth offline, prior to deployment).

Aspects of the disclosure are initially described in the context of wireless communications systems. Aspects of the disclosure are additionally described in the context of imbalance estimation graphs and a process flow. Aspects of the disclosure are further illustrated by and described with reference to apparatus diagrams, system diagrams, and flowcharts that relate to coherence bandwidth signaling for frequency domain imbalance correction.

FIG. 1 shows an example of a wireless communications system 100 that supports coherence bandwidth signaling for frequency domain imbalance correction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support coherence bandwidth signaling for frequency domain imbalance correction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple SCs (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one SC, in which case the symbol period and SC spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a SC spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported SC spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SC spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the SC spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna array's (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, the wireless communications system 100 may include one or more devices that utilize IQ modulators to process communication signals. In some examples, however, an IQ modulator of a device may be associated with signaling mismatch or error introduced by hardware components (e.g., different hardware processing chains), among one or more other factors. For example, an IQ modulator may generate RF signals with gain (e.g., amplitude) and phase imbalances (e.g., errors), such as a difference (e.g., imbalance, mismatch) in gain between an I portion and a Q portion of an RF signal or a difference in phase between the I portion and the Q portion of the RF signal. Such imbalances may be referred to as IQ imbalance, IQ mismatch, gain and phase mismatch, IQ impairment, frequency dependent IQ imbalance, frequency domain residual side band (FDRSB), frequency domain imbalance, or the like. In some cases, if the IQ imbalance is left uncorrected, the wireless communications system 100 may experience decreased operating performance (e.g., reduced link performance, lower transmission quality). As such, to increase operating performance, throughput, and communications quality, the wireless communications system 100 may compensate (e.g., cancel, equalize, or otherwise compensate) for the IQ imbalance.

In some operating bands (e.g., in high frequency bands, sub-6 GHz bands, millimeter wave bands, sub-THz bands), a network entity 105 may use a relatively large quantity of antennas to form relatively narrow beams with relatively high gain and relatively low pathloss. In such examples, however, each antenna may be associated with a respective IQ modulator (e.g., IQ processing chain) to perform communications with one or more UEs 115, and each respective IQ modulator may be associated with a respective IQ imbalance. In such cases, compensating for IQ imbalance may be relatively complex for the network entity 105. For example, the network entity 105 may utilize multiple IQ modulators (e.g., each corresponding to a transmit antenna) for transmitting signals to multiple UEs (e.g., or for transmitting multiple signals to the same UE via different antennas). Each of the multiple IQ modulators may be associated with a corresponding IQ imbalance, and the network entity may correct or compensate for each of the signals output by the multiple IQ modulators (e.g., on a per-signal basis). Thus, as the quantity of UEs 115 served by the network entity 105 increases, the complexity of compensating for IQ imbalance for each IQ modulator for each UE 115 may also increase. Additionally, in some cases, compensating for each respective IQ imbalance at the network entity 105 may lead to increased hardware and computation complexity and increased hardware cost, among other challenges.

In some implementations, a UE 115 may compensate (e.g., cancel, equalize, reduce, or correct) for IQ imbalance introduced by an IQ modulator at a network entity 105 to reduce complexity and power expenditure at the network entity 105. For example, the UE 115 may perform processing procedures to correct the IQ imbalance with a relatively low impact on performance. For example, the UE 115 may perform the IQ imbalance compensation with a relatively low impact on power consumption (e.g., and without additional hardware) using various techniques described herein.

In some examples, in accordance with the examples described herein, a network entity 105 may indicate to a UE 115 a recommended coherence bandwidth for the UE 115 to use for estimating an IQ imbalance associated with the network entity 105. For example, a UE 115 may transmit a capability message to a network entity 105 indicating a capability of the UE 115 to estimate a frequency domain imbalance (e.g., the IQ imbalance) between an I portion of a transmission chain of the network entity 105 and a Q-phase portion of the transmission chain of the network entity 105. The UE 115 may receive, from the network entity 105 and based on the capability message, an indication of a coherence bandwidth associated with the frequency domain imbalance. The coherence bandwidth may indicate a quantity of SCs over which a characteristic of the frequency domain imbalance (e.g., a change in amplitude of the frequency domain imbalance) satisfies a threshold. The UE 115 may perform an estimation of the frequency domain imbalance based on the coherence bandwidth. In some examples, the UE 115 may receive downlink signals from a network entity 105 and may perform a correction of the downlink signals based on the estimation.

Figure 2:
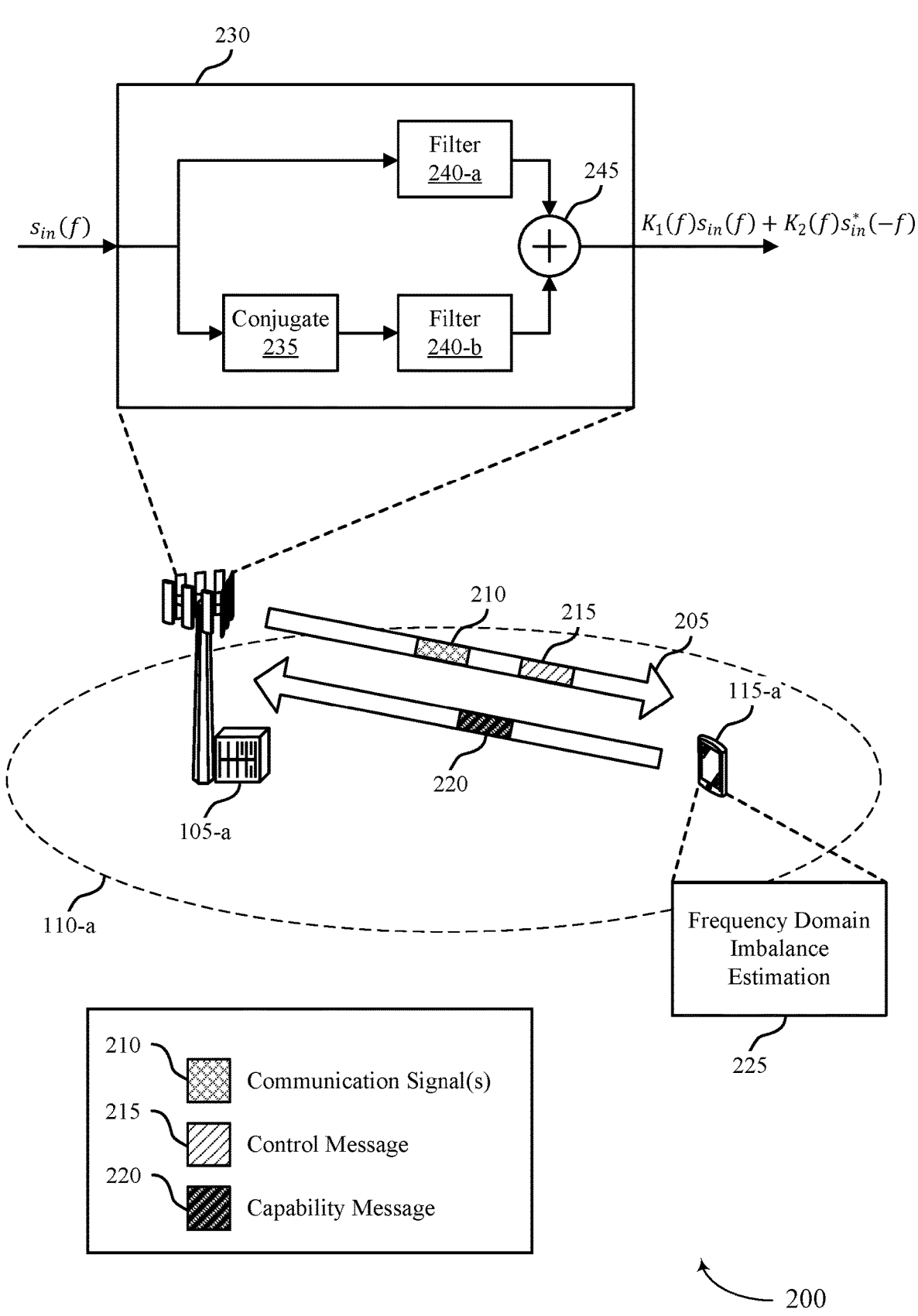
FIG. 2 shows an example of a wireless communications system that supports coherence bandwidth signaling for frequency domain imbalance correction in accordance with one or more aspects of the present disclosure.

FIG. 2 shows an example of a wireless communications system 200 that supports coherence bandwidth signaling for frequency domain imbalance correction in accordance with one or more aspects of the present disclosure. The wireless communications system 200 may implement aspects of the wireless communications system 100 or may be implemented by aspects of the wireless communications system 100. For example, the wireless communications system 200 may include a network entity 105-a, a UE 115-a, and a communication link 205, which may be examples of network entities 105, UEs 115, and communication links 125 as described with reference to FIG. 1.

The network entity 105-a may communicate with the UE 115-a using the communication link 205 within the coverage area 110-a. The network entity 105-a and the UE 115-a may establish the communication link 205 via a communication channel (e.g., air interface, frequency band, or bandwidth part). In some cases, to increase communications quality, the network entity 105-*a* may perform various signal processing techniques to one or more communication signals 210 (e.g., prior to or as part of transmitting). For example, the network entity 105-*a* may process the one or more communication signals 210 by performing signal precoding (e.g., applying a precoder to downlink signals) and performing IQ modulation to transmit the downlink signals (e.g., in a MIMO system). In such examples, the network entity 105-*a* may use the precoder to increase throughput at the UE 115-*a* and to support MIMO communications in which multiple data streams are transmitted from the network entity 105-*a*. In some examples, the network entity 105-*a* may use one or more IQ modulators to generate one or more RF signals (e.g., with various combinations of gain and phase). In such examples, the network entity 105-*a* may perform IQ modulation on the one or more communication signals 210 (e.g., after applying the precoder and before transmitting the signal over the communication channel via the communication link 205). In some examples, such as after application of the precoder, the communication signal 210 may be represented in as a function s(t) in accordance with the following Equation 1:

$$s(t) = I(t) + jQ(t) \quad (1)$$

in which I(t) represents the I portion of the communication signal 210 and Q(t) represents the Q portion of the communication signal 210.

In some cases, the one or more communication signals 210 may be input to (e.g., passed to) an IQ modulator 230. The IQ modulator 230 may include one or more components such as a conjugate block 235, a filter 240-*a*, a filter 240-*b*, and a summing component 245. The filter 240-*a* and the filter 240-*b* may be functions of a gain (g) and a phase (θ). For example, the filter 240-*a* may be represented as a function $K_1(f)$ in accordance with the following Equation 2:

$$K_1(f) = 1 + ge^{j\theta} \quad (2)$$

and the filter 240-*b* may be represented as a function $K_2(f)$ in accordance with the following Equation 3:

$$K_2(f) = 1 - ge^{j\theta}. \quad (3)$$

The IQ modulator 230 may process the communication signal 210 (e.g., represented as $s_{in}(f)$) to modulate the communication signal 210 with various amplitude and phase configurations. For example, the network entity 105-*b* may use the IQ modulator 230 to generate multiple (e.g., different) output communication signals (e.g., RF signals) with multiple (e.g., different, unique) amplitude and phase modulations.

In some implementations, however, the IQ modulator 230 may introduce error to the one or more communication signals 210 that the network entity 105-*a* transmits. For example, the IQ modulator 230 may produce output communication signals (e.g., IQ signals) with relatively inaccurate characteristics (e.g., inaccurate relative to an expected output), such as gain and phase errors. Such errors may cause a frequency domain imbalance (e.g., an FDRSB) of the wireless communications system 200. The frequency domain imbalance may be due to a lack of synchronization between an I mixer (e.g., represented by the filter 240-*a*) and a Q mixer (e.g., represented by the conjugate block 235 and the filter 240-*b*). The frequency domain imbalance may increase as an operating frequency of the wireless communication system increases (e.g., for example, for sub-6 GHz frequency bands, millimeter wave bands, subThz). In some cases, such as in MIMO systems (e.g., relatively large MIMO systems), a quantity of transmit antennas at the network entity 105-*a* may increase which may cause an increase in the frequency domain imbalance.

The frequency domain imbalance may reduce a data transmission rate achievable by the network entity 105-*b*. In some examples, the network entity 105-*a* may configure the one or more communication signals 210 such that the frequency domain imbalance is below a threshold power (e.g., 30 dB), which may enable the network entity 105 to perform Q amplitude modulations (QAM) of the one or more communication signals 210 up to a threshold modulation order (e.g., 256 QAM). However, to perform modulations above the threshold modulation order (e.g., to perform superQAM modulations, modulations above 256QAM, 16K QAM modulations), the frequency domain imbalance may be further reduced (e.g., to below 45 dB). As such, correcting the frequency domain imbalance (e.g., the gain and phase errors) may be advantageous for a wireless communications system (e.g., wireless communications system 100, wireless communications system 200, etc.) to increase system performance and data transmission rate.

In some examples, the UE 115-*a* may perform frequency domain imbalance mitigation (e.g., estimation, correction) to enable the network entity 105 to perform modulations above the threshold modulation order. For example, the UE 115-*a* may perform a frequency domain imbalance estimation 225 for the one or more received communication signals 210. To perform the frequency domain imbalance estimation 225, the UE 115-*a* may estimate the frequency domain imbalance in the frequency domain by averaging the frequency domain imbalance over a quantity of SCs. For example, the UE 115 may assume a coherence bandwidth, also referred to as a flatness factor, or an averaging factor for estimation, of the frequency domain imbalance curve. The coherence bandwidth of the frequency domain imbalance curve may indicate a quantity of SCs for which the frequency domain imbalance curve satisfies a threshold (e.g., is approximately flat). As such, the UE 115-*a* may use the coherence bandwidth for determining the quantity of SCs to average the frequency domain imbalance over.

The UE 115-*a* may use a coherence bandwidth that is common across multiple network entities to perform the frequency domain imbalance estimation 225. However, a frequency domain imbalance for a network entity (e.g., each network entity) may be associated with a respective coherence bandwidth. As such, multiple (e.g., different) network entities may be associated with multiple (e.g., different) coherence bandwidths. That is, for each network entity, the frequency domain imbalance may have a coherence bandwidth that indicates a quantity of SCs over which a characteristic of the frequency domain imbalance satisfies a threshold. For example, the coherence bandwidth associated with the network entity 105-*a* may indicate a quantity of SCs over which a change in amplitude of the frequency domain imbalance satisfies (e.g., is below) the threshold. The UE 115-*a* may estimate the frequency domain imbalance for the network entity 105-*a* using a common coherence bandwidth (e.g., a common quantity of SCs) for multiple network entities. That is, the UE 115-*a* may use a same coherence bandwidth (e.g., averaging factor) to estimate the frequency domain imbalance for a signal irrespective of the network entity from which the signal is received. In other words, the coherence bandwidth that the UE 115-a uses to estimate the frequency domain imbalance of the network entity 105-a may be unassociated with (e.g., unrelated to) the coherence bandwidth of the network entity 105-a.

In accordance with the examples described herein, the network entity 105-a may indicate to the UE 115-a (e.g., or multiple UEs 115), via a control message 215, the coherence bandwidth (e.g., flatness factor) associated with the frequency domain imbalance of the network entity 105-a. The network entity 105 may indicate the coherence bandwidth to the UE 115-a based on the UE 115-a transmitting a capability message 220 to the UE 115-a. The capability message 220 may indicate a capability of the UE 115-a to estimate (and correct for) the frequency domain imbalance. The coherence bandwidth may be an indicator of an averaging factor (e.g., a recommended averaging factor) that the UE 115-a uses to estimate the frequency domain imbalance. By supporting indication of the coherence bandwidth to the UE 115-a, the UE 115-a may increase an accuracy of the estimation of, and therefore improve the correction (e.g., removal) of, the frequency domain imbalance, which may support increased data transmission rates and improved system performance.

The frequency domain imbalance introduced by the IQ modulator 230 may be identified (e.g., reflected) by adding the conjugate of the image of the one or more input transmission signals $s_{in}(f)$ (e.g., the one or more communication signals 210). For example, the processing performed by the IQ modulator 230 for each communication signal $s_{in}(f)$ may result in an output communication signal $s_{out}(f)$ represented by the following Equation 4:

$$s_{out}(f) = K_1(f) \cdot s_{in}(f) + K_2(f) \cdot s_{in}^*(-f) = K_1(f)\left(s_{in}(f) + \frac{K_2(f)}{K_1(f)} \cdot s_{in}^*(-f)\right) \quad (4)$$

in which the coherence bandwidth associated with the frequency domain imbalance may be represented by a value of $$\frac{K_2(f)}{K_1(f)},$$

which may be denoted by a function $\Phi(f)$. In some examples, multiplication of $s_{in}(f)$ by $K_1(f)$ in Equation 1 may represent (e.g., be treated as part of) channel estimation.

In some examples, the network entity 105-a may perform offline measurements (e.g., before transmitting either the one or more communication signals 210 or a control message 215) to determine the coherence bandwidth (e.g., recommended averaging factor) of the network entity 105-a. For example, the network entity 105-a may perform measurements with lab equipment (e.g., a spectrum analyzer). In some examples, the network entity 105-a may perform a first measurement and a second measurement. The network entity 105-a may use the first measurement and the second measurement to determine a value of $K_1(f)$ and $K_1(f)$ and, accordingly, a value of the frequency domain imbalance $$\Phi(f) = \frac{K_2(f)}{K_1(f)}.$$

Based on the value of the frequency domain imbalance $\Phi(f)$, the network entity 105-a may determine the coherence bandwidth associated with the frequency domain imbalance curve.

The first measurement may be based on the network entity 105-a recording a half band signal allocated on a left side of a bandwidth of the network entity 105-a. The half band signal may have a first value (e.g., a fixed or static value, such as 0 dB) over the SCs on the left side of the bandwidth and may have a second value (e.g., a second dB value) over other SCs of the bandwidth (e.g., a right side of the bandwidth). In some examples, the second value may be equal to the frequency domain imbalance. The first measurement may be represented by a function $m_1(f)$ in accordance with the following Equation 5:

$$m_1(f) = K_1(f) \cdot u(-f) + K_2(f)u(f) \quad (5)$$

in which $u(f)$ may denote a step function, where $u(f)=1$ for $f \geq 0$ and $u(f)=0$ for $f<0$. The second measurement may be based on the network entity 105-a recording a half band signal allocated on a right side of the bandwidth of the network entity 105-a. The half band signal may have a first value (e.g., a fixed or static value, such as 0 dB) over the SCs on the right side of the bandwidth, and may have a second value (e.g., a second dB value) over other SCs of the bandwidth (e.g., a left side of the bandwidth). In some examples, the second value may be equal to the frequency domain imbalance. The second measurement may be represented as a function $m_2(f)$ in accordance with the following Equation 6:

$$m_2(f) = K_1(f) \cdot u(f) + K_2(f)u(-f) \quad (6)$$

in which $u(f)$ may denote a step function, where $u(f)=1$ for $f \geq 0$ and $u(f)=0$ for $f<0$.

The network entity 105-a may transmit the control message 215 to the UE 115-a that indicates a coherence bandwidth (e.g., flatness factor, recommended averaging factor) for the UE 115-a to perform the frequency domain imbalance estimation 225. The coherence bandwidth may correspond to the frequency domain imbalance value $$\Phi(f) = \frac{K_2(f)}{K_1(f)}.$$

In some cases, where variation of the frequency domain imbalance (e.g., $\Phi(f)$) is relatively high, the network entity 105-a may recommend a relatively small coherence bandwidth. In other cases where variation of the frequency domain imbalance is relatively low; the network entity 105-a may recommend a relatively large coherence bandwidth. In some cases, the network entity 105-a may add a noise to the measurements (e.g., the first measurement, the second measurement) and may determine multiple candidate coherence bandwidths of the frequency domain imbalance of the network entity 105-a. The network entity 105-a may perform one or more estimations of the frequency domain imbalance using the multiple candidate coherence bandwidths. The network entity 105-a may select the coherence bandwidth from the multiple candidate coherence bandwidths, for example, based on the coherence bandwidth being associated with a lower estimated error of the frequency domain imbalance relative to other estimated errors of the frequency domain imbalance associated with the other candidate coherence bandwidths.

Figures 3A, 3B:
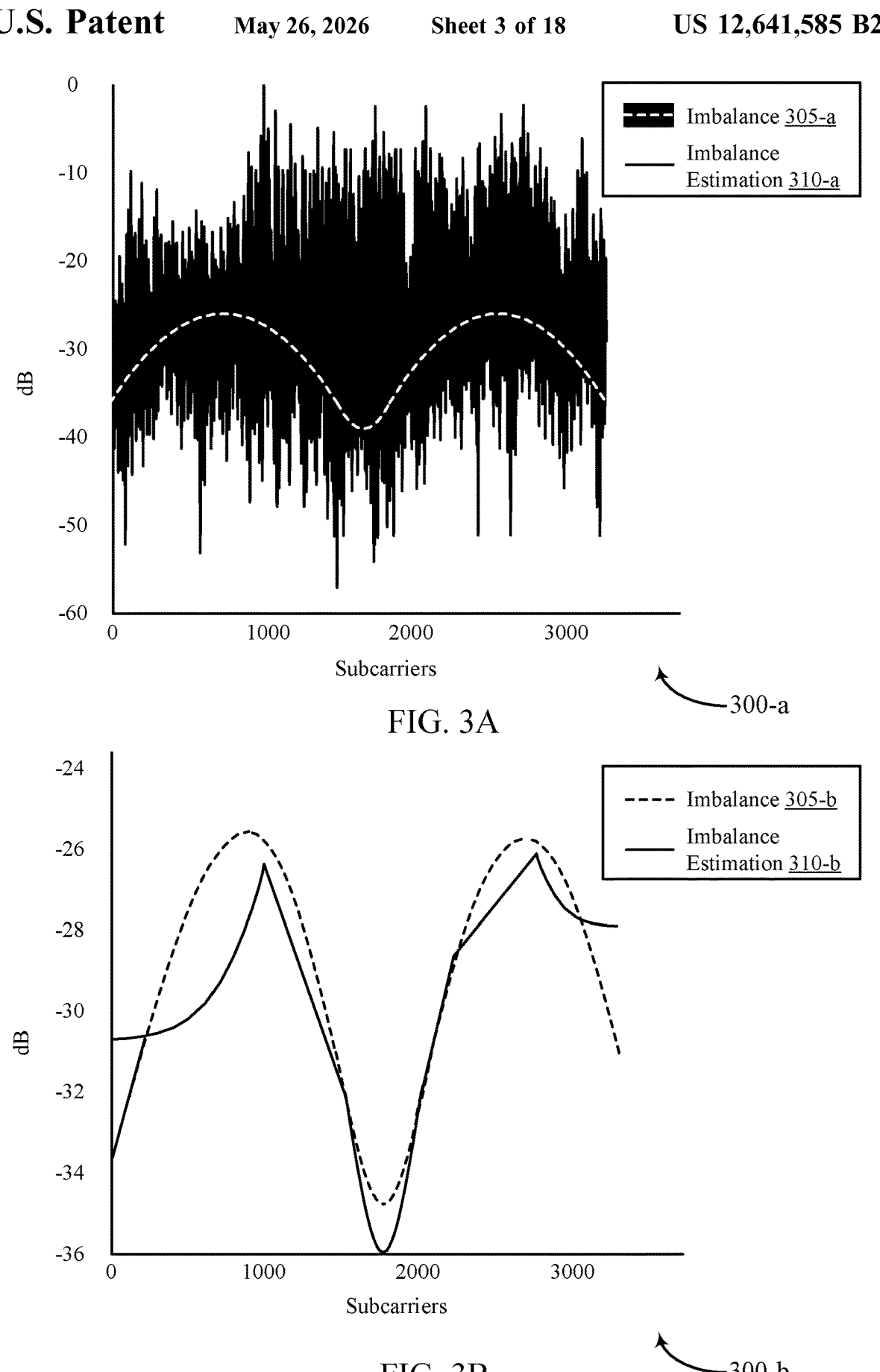
FIGS. 3A, 3B and 3C show examples of imbalance estimation graphs that support coherence bandwidth signaling for frequency domain imbalance correction in accordance with one or more aspects of the present disclosure.
Figure 3C:
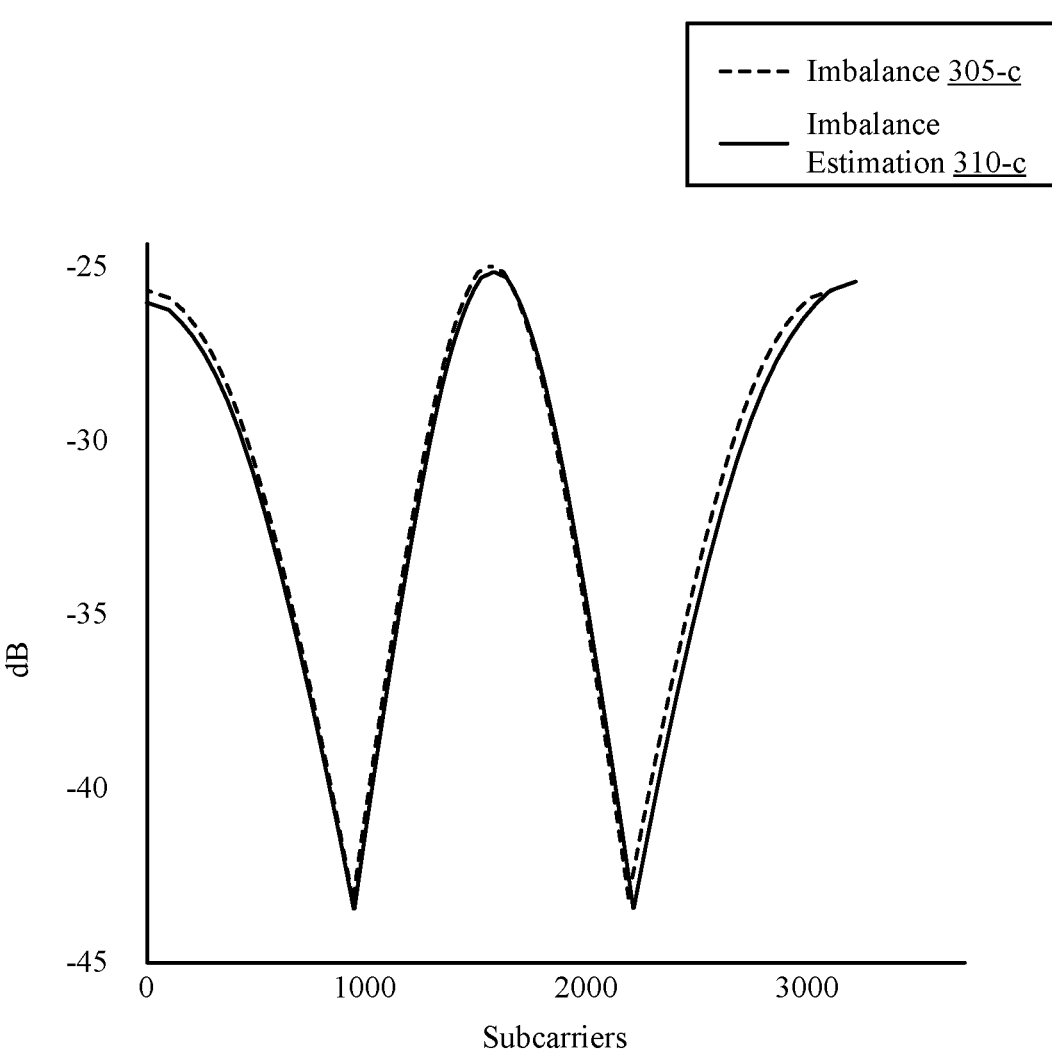

FIGS. 3A, 3B and 3C show examples of imbalance estimation graphs 300 that support coherence bandwidth signaling for frequency domain imbalance correction in accordance with one or more aspects of the present disclosure. In some examples, one or both of the imbalance estimation graphs 300 (e.g., an imbalance estimation graph 300-a, an imbalance estimation graph 300-b, or an imbalance estimation graph 300-c) may be implemented by aspects of the wireless communications system 100 or the wireless communications system 200. For example, a network entity or a UE may use the imbalance estimation graphs 300 to estimate a frequency domain imbalance of an IQ modulator. The network entity and the UE may be examples of the corresponding devices illustrated by and described with reference to FIGS. 1 and 2. Additionally, the IQ modulator may be an example of an IQ modulator 230 illustrated by and described with reference to FIG. 2. In some examples, the network entity or the UE may use the imbalance estimation graphs 300 to determine (e.g., and indicate) a coherence bandwidth for estimating the frequency domain imbalance.

To mitigate the frequency domain imbalance associated with a signal that the UE receives, the UE may estimate the frequency domain imbalance and remove it from the signal. An imbalance 305-a may represent a frequency domain imbalance curve for one or more transmission antennas of the network entity. For example, the imbalance 305-a may represent a single transmission antenna of a network entity (e.g., of the wireless communications system 200). The network entity may support multiple transmission antennas for communication of the signal, and each of the transmission antennas may be associated with a respective imbalance (e.g., a respective frequency domain imbalance).

In some examples, the UE may estimate (e.g., may perform an estimation of) a frequency domain imbalance without averaging. That is, the UE may obtain an estimation of the frequency domain imbalance without averaging over multiple SCs (e.g., more than one SC). In the example of FIG. 3A, an imbalance estimation 310-a may correspond to an estimation of the imbalance 305-a. The UE may obtain (e.g., generate) the imbalance estimation 310-a by performing the estimation with respect to a SC (e.g., each SC) of a bandwidth associated with a signal (e.g., a signal for which the estimation may be performed, a signal from which the imbalance estimation 310-a may be removed). That is, the UE may obtain the imbalance estimation 310-a without averaging the imbalance 305-a over multiple SCs. In other words, a value of a coherence bandwidth (e.g., flatness factor) for the imbalance estimation 310-a may be one. However, by obtaining the imbalance estimation 310-a without averaging (e.g., by estimating the imbalance 305-a without averaging), the imbalance estimation 310-a may be associated with an error (e.g., inaccuracy) relative to the imbalance 305-a. That is, the imbalance estimation 310-a may be relatively inaccurate. The UE may remove the estimated frequency domain imbalance (e.g., the imbalance estimation 310-a) from the signal (e.g., may perform an imbalance correction). However, because the imbalance estimation 310-a may be a relatively inaccurate estimation of the imbalance 305-a, a residual frequency domain imbalance of the signal may remain after the UE removes the estimated frequency domain imbalance from the signal. The residual frequency domain imbalance may cause a relatively high error vector magnitude (EVM) (e.g., EVM=−7 dB, an EVM exceeding a threshold EVM) corresponding to the signal, which may not support some modulation orders (e.g., modulation orders above 256QAM).

In some other examples, the UE may estimate (e.g., may perform an estimation of) a frequency domain imbalance with averaging. That is, the UE may obtain an estimation of the frequency domain imbalance by averaging over multiple SCs (e.g., more than one SC). As illustrated in the example of FIG. 3B, the UE may obtain an imbalance estimation 310-b of the imbalance 305-b by performing an estimation of the imbalance 305-b based on a coherence bandwidth (e.g., by using averaging over multiple SCs) unassociated with the network entity. For example, the UE may use a same coherence bandwidth (e.g., 500 SCs) across multiple network entities. However, imbalances may vary across network entities and a coherence bandwidth of 500 SCs may be unsuitable for the imbalance 305-b. That is, the network entity may determine the coherence bandwidth for the imbalance 305-b, which may be different from (e.g., smaller than) the coherence bandwidth (e.g., 500 SCs) used to generate the imbalance estimation 310-b. In such an example, the coherence bandwidth used for the imbalance estimation 310-b may be high (e.g., 500 SCs) relative to a recommended coherence bandwidth (e.g., 80 SCs) of the imbalance 305-b. By averaging over a relatively large quantity of SCs (e.g., by including a relatively large quantity of SCs in each averaging of the frequency domain imbalance) to generate the imbalance estimation 310-b, the imbalance estimation 310-b may be associated with an error (e.g., inaccuracy) relative to the imbalance 305-b. The UE may remove the estimated frequency domain imbalance from the signal (e.g., perform an imbalance correction). However, because the imbalance estimation 310-b may be a relatively inaccurate estimation of the imbalance 305-b, a residual frequency domain imbalance of the signal may remain after the UE removes the estimated frequency domain imbalance from the signal. The residual frequency domain imbalance may cause a relatively high EVM (e.g., EVM=−36 dB, an EVM exceeding a threshold EVM) corresponding to the signal, which may not support some modulation orders (e.g., modulation orders above 256QAM).

In accordance with examples described herein, a network entity may indicate to the UE a coherence bandwidth (e.g., quantity of SCs to include in each averaging) to use for performing estimation of the frequency domain imbalance. As illustrated in the example of FIG. 3C, the network entity may indicate a coherence bandwidth of an imbalance 305-c of the network entity. The UE may use the coherence bandwidth to perform an imbalance estimation 310-c of the frequency domain imbalance with greater accuracy relative to the imbalance estimation 310-a and the imbalance estimation 310-b (e.g., that use other coherence bandwidths). The UE may remove the estimated frequency domain imbalance from the signal (e.g., may perform an imbalance correction) and a low residual frequency domain imbalance may remain after the removal, relative to the examples described with reference to the imbalance estimation 310-a and the imbalance estimation 310-b. Thus, the imbalance estimation may cause a relatively low EVM (e.g., EVM=−36 dB) corresponding to the signal, which may support relatively higher order modulations (e.g., modulations above a threshold modulation order, modulations above 256QAM).

In some examples, the UE may obtain multiple coherence bandwidths for multiple network entities. That is, a network entity (e.g., each of the multiple network entities) may indicate, to the UE, a respective coherence bandwidth corresponding to the network entity (e.g., its own coherence bandwidth). Thus, the UE may perform imbalance estimations using coherence bandwidths that are based on the respective coherence bandwidth associated with each network entity of the multiple network entities (e.g., a set of network entities). The UE may store coherence bandwidths associated with (e.g., mapped to) respective network entities, for example, in a database.

FIG. 4 shows an example of a process flow 400 that supports coherence bandwidth signaling for frequency domain imbalance correction in accordance with one or more aspects of the present disclosure. The process flow 400 may implement or may be implemented by aspects of the wireless communication system 100 or the wireless communications system 200. For example, the process flow 400 may include a UE 115-*b*, a network entity 105-*b*, and a network entity 105-*c*, which may be examples of corresponding devices as described with reference to FIGS. 1 and 2.

In the following description of the process flow 400, the operations between the UE 115-*b*, the network entity 105-*b*, and the network entity 105-*c* may be transmitted in a different order than the example order shown, or the operations performed by the UE 115-*b*, the network entity 105-*b*, and the network entity 105-*c* may be performed in different orders or at different times. Some operations may also be omitted from the process flow 400, and other operations may be added to the process flow 400.

At 405, the network entity 105-*b* may perform one or more measurements associated with a change in amplitude of a frequency domain imbalance (e.g., IQ imbalance, frequency dependent IQ imbalance, FDRSB) between an I portion of a transmission chain (e.g., an IQ modulator) of the network entity 105-*b* and a Q-phase portion of the transmission chain of the network entity 105-*b*. The network entity 105-*b* may calculate a coherence bandwidth (e.g., flatness factor, recommended averaging factor) associated with the frequency domain imbalance based on the one or more measurements. In some examples, the network entity 105-*b* may perform one or more estimations of the frequency domain imbalance using a set of candidate coherence bandwidth that includes at least the coherence bandwidth. The network entity 105-*b* may select the coherence bandwidth from among the set of candidate coherence bandwidth based on an estimated error associated with the coherence bandwidth being lower than one or more estimated errors associated with the one or more other coherence bandwidths of the set.

At 410, the UE 115-*b* may transmit a capability message indicating a capability of the UE 115-*b* to estimate the frequency domain imbalance of a network entity 105 (e.g., the network entity 105-*b*, the network entity 105-*c*, any other network entity 105). The capability message may include a single bit that indicates the capability of the UE 115-*b*. In some examples, the UE 115-*b* may transmit the capability message via uplink control information (UCI), uplink signaling, or any other signaling associated with attachment of the UE 115-*b* to the network entity 105-*b* (e.g., UE-cell attachment signaling).

At 415, the UE 115-*b* may receive, from the network entity 105-*b* and based on the capability message, an indication of the coherence bandwidth (e.g., flatness factor, recommended averaging factor) associated with the frequency domain imbalance. The coherence bandwidth may indicate a quantity of SCs over which a characteristic of the frequency domain imbalance satisfies a threshold. For example, the characteristic may include a change in amplitude of the frequency domain imbalance, and the coherence bandwidth may indicate that the change in amplitude of the frequency domain imbalance over the quantity of SCs is below the threshold (e.g., is approximately constant). In some examples, the UE 115-*b* may receive the indication from the network entity 105-*b* via MAC layer signaling, RRC signaling, or PHY layer signaling. In some examples, the indication may include an identifier of the network entity 105-*b*. In some cases, the network entity 105-*b* may transmit an indication to update the coherence bandwidth associated with the network entity 105-*b*, and the indication may include an offset associated with the coherence bandwidth (e.g., or may indicate a second coherence bandwidth different from the coherence bandwidth).

At 420, the UE 115-*b* may perform an estimation of the frequency domain imbalance based on the coherence bandwidth. For example, the UE 115-*b* may average the frequency domain imbalance over the quantity of SCs (e.g., over an averaging factor corresponding to the coherence bandwidth), and the estimation of the frequency domain imbalance may be based on the averaging.

At 425, the UE 115-*b* may receive, from the network entity 105-*c*, a second indication of a second coherence bandwidth associated with a second frequency domain imbalance of the network entity 105-*b*. The second indication may include an identifier of the network entity 105-*c*, or may otherwise be differentiated from the coherence bandwidth indication of the network entity 105-*b*. At 430, the UE 115-*b* may perform a second estimation of the second frequency domain imbalance based on the second coherence bandwidth.

At 435, the UE 115-*b* may receive, from the network entity 105-*b*, one or more downlink signals. The UE 115-*b* may perform a correction of the one or more downlink signals based on the estimation of the frequency domain imbalance (e.g., by cancelling or removing the estimated frequency domain imbalance from the signal).

Figure 5:
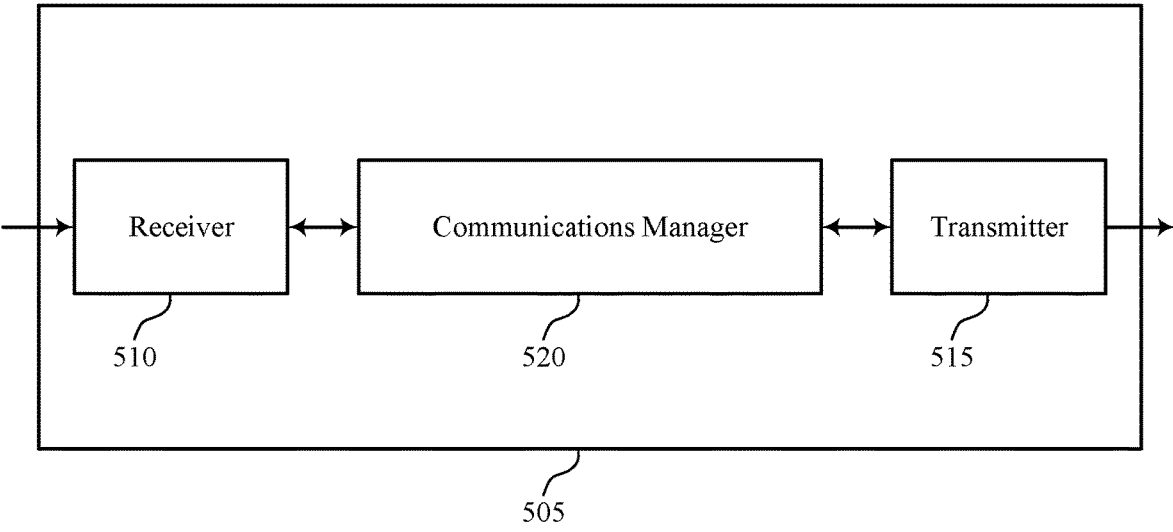
FIGS. 5 and 6 show block diagrams of devices that support coherence bandwidth signaling for frequency domain imbalance correction in accordance with one or more aspects of the present disclosure.

FIG. 5 shows a block diagram 500 of a device 505 that supports coherence bandwidth signaling for frequency domain imbalance correction in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to coherence bandwidth signaling for frequency domain imbalance correction). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coherence bandwidth signaling for frequency domain imbalance correction). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of coherence bandwidth signaling for frequency domain imbalance correction as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for transmitting a capability message indicating a capability of the UE to estimate a frequency domain imbalance between an I portion of a transmission chain of a network entity and a Q-phase portion of the transmission chain of the network entity. The communications manager 520 is capable of, configured to, or operable to support a means for receiving, based on the capability message, an indication of a coherence bandwidth associated with the frequency domain imbalance, where the coherence bandwidth indicates a quantity of SCs over which a characteristic of the frequency domain imbalance satisfies a threshold. The communications manager 520 is capable of, configured to, or operable to support a means for performing an estimation of the frequency domain imbalance based on the coherence bandwidth.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing and reduced power consumption by reducing noise or errors in communication that may be associated with communications between a UE and a network entity and enabling increased modulation orders.

Figure 6:
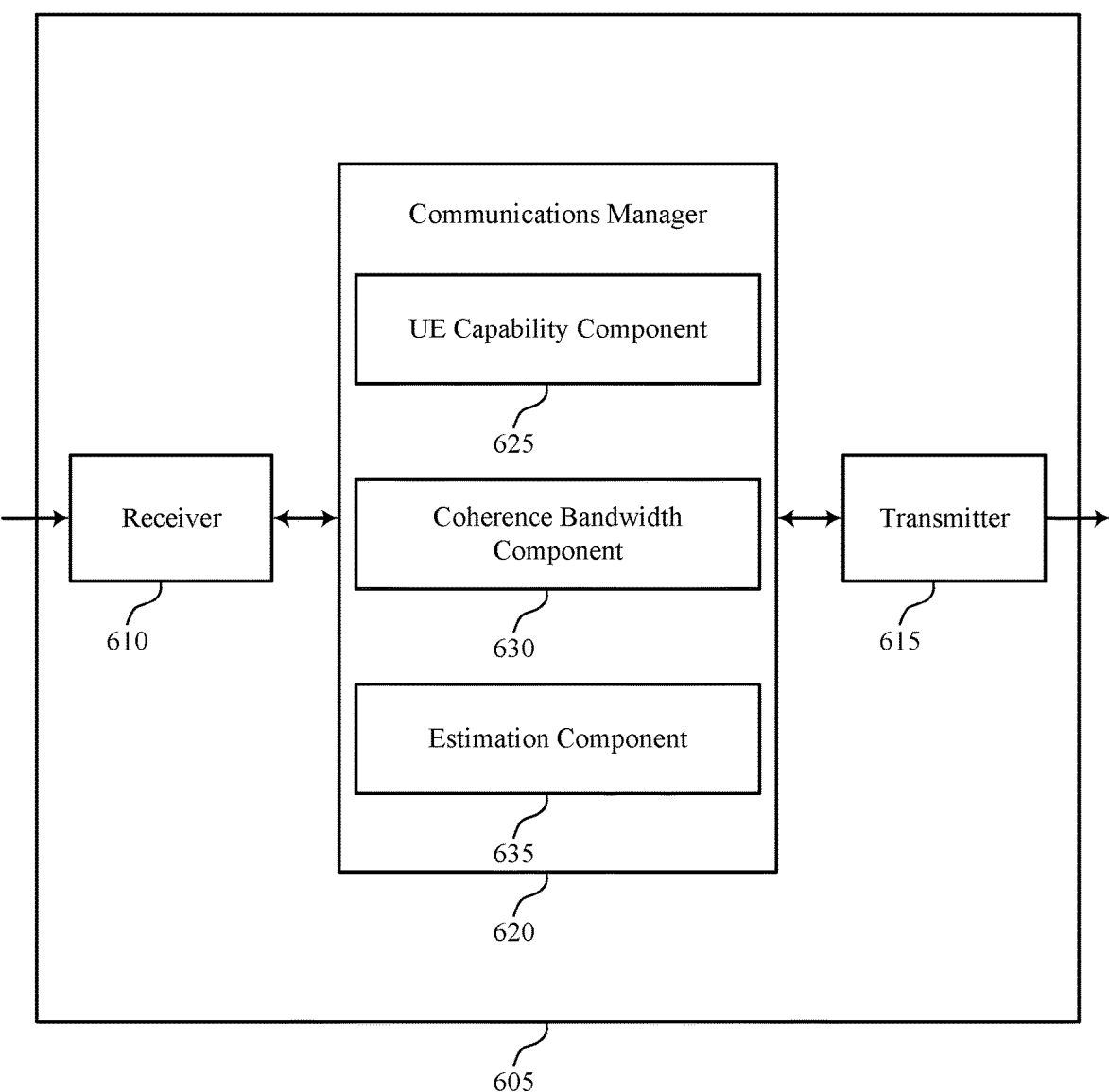

FIG. 6 shows a block diagram 600 of a device 605 that supports coherence bandwidth signaling for frequency domain imbalance correction in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to coherence bandwidth signaling for frequency domain imbalance correction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coherence bandwidth signaling for frequency domain imbalance correction). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of coherence bandwidth signaling for frequency domain imbalance correction as described herein. For example, the communications manager 620 may include a UE capability component 625, a coherence bandwidth component 630, an estimation component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The UE capability component 625 is capable of, configured to, or operable to support a means for transmitting a capability message indicating a capability of the UE to estimate a frequency domain imbalance between an I portion of a transmission chain of a network entity and a Q-phase portion of the transmission chain of the network entity. The coherence bandwidth component 630 is capable of, configured to, or operable to support a means for receiving, based on the capability message, an indication of a coherence bandwidth associated with the frequency domain imbalance, where the coherence bandwidth indicates a quantity of SCs over which a characteristic of the frequency domain imbalance satisfies a threshold. The estimation component 635 is capable of, configured to, or operable to support a means for performing an estimation of the frequency domain imbalance based on the coherence bandwidth.

Figure 7:
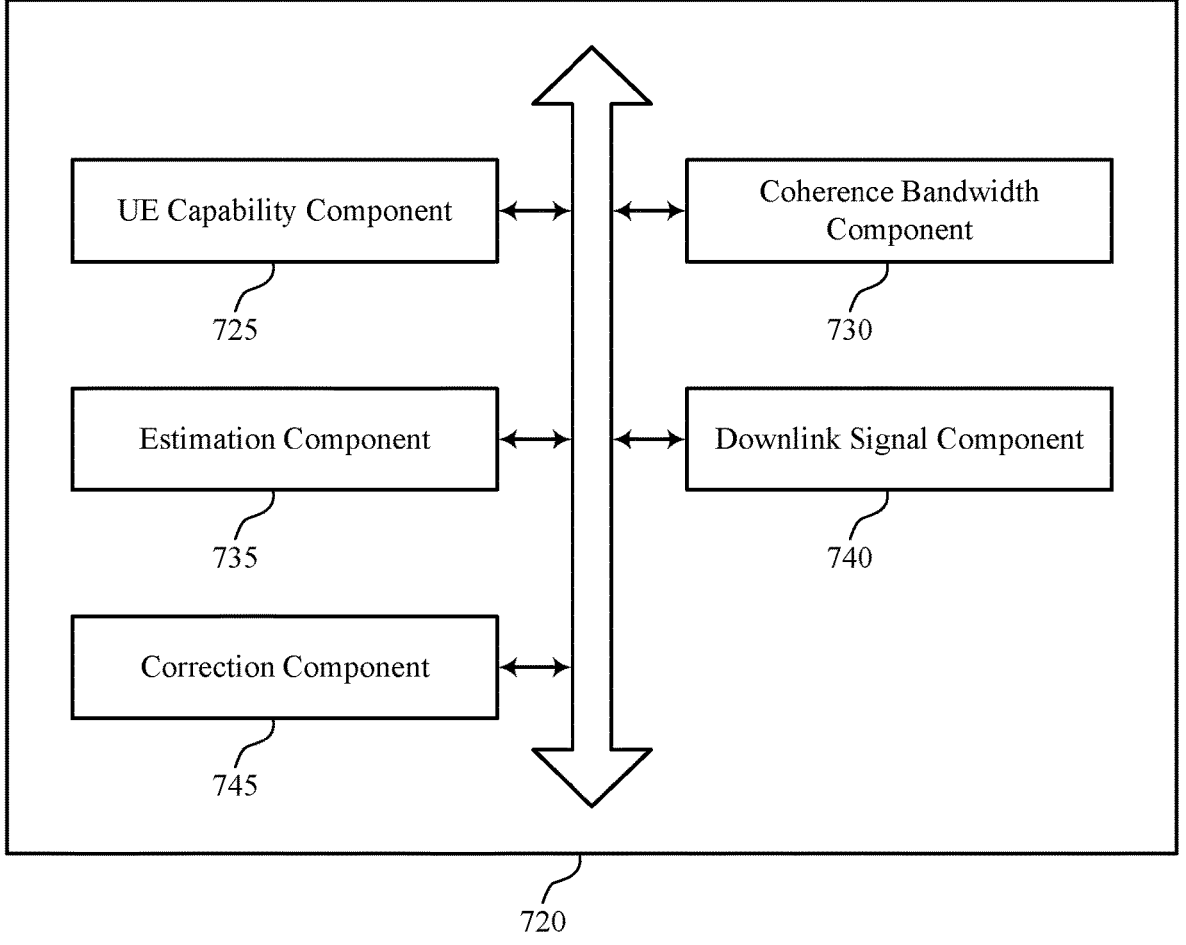
FIG. 7 shows a block diagram of a communications manager that supports coherence bandwidth signaling for frequency domain imbalance correction in accordance with one or more aspects of the present disclosure.

FIG. 7 shows a block diagram 700 of a communications manager 720 that supports coherence bandwidth signaling for frequency domain imbalance correction in accordance with one or more aspects of the present disclosure. The communications manager 720 may be an example of aspects of a communications manager 520, a communications manager 620, or both, as described herein. The communications manager 720, or various components thereof, may be an example of means for performing various aspects of coherence bandwidth signaling for frequency domain imbalance correction as described herein. For example, the communications manager 720 may include a UE capability component 725, a coherence bandwidth component 730, an estimation component 735, a downlink signal component 740, a correction component 745, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The UE capability component 725 is capable of, configured to, or operable to support a means for transmitting a capability message indicating a capability of the UE to estimate a frequency domain imbalance between an I portion of a transmission chain of a network entity and a Q-phase portion of the transmission chain of the network entity. The coherence bandwidth component 730 is capable of, configured to, or operable to support a means for receiving, based on the capability message, an indication of a coherence bandwidth associated with the frequency domain imbalance, where the coherence bandwidth indicates a quantity of SCs over which a characteristic of the frequency domain imbalance satisfies a threshold. The estimation component 735 is capable of, configured to, or operable to support a means for performing an estimation of the frequency domain imbalance based on the coherence bandwidth.

In some examples, to support receiving the indication of the coherence bandwidth, the coherence bandwidth component 730 is capable of, configured to, or operable to support a means for receiving, from the network entity, a message including the indication of the coherence bandwidth.

In some examples, the coherence bandwidth component 730 is capable of, configured to, or operable to support a means for receiving, from a second network entity, a second indication of a second coherence bandwidth associated with a second frequency domain imbalance of the second network entity. In some examples, the estimation component 735 is capable of, configured to, or operable to support a means for performing a second estimation of the second frequency domain imbalance based on the second coherence bandwidth.

In some examples, to support receiving the message, the coherence bandwidth component 730 is capable of, configured to, or operable to support a means for receiving the message via MAC layer signaling, RRC layer signaling, or PHY layer signaling.

In some examples, to support performing the estimation of the frequency domain imbalance, the estimation component 735 is capable of, configured to, or operable to support a means for averaging the frequency domain imbalance over the quantity of SCs, where the estimation of the frequency domain imbalance is based on the averaging.

In some examples, the characteristic includes a change in amplitude of the frequency domain imbalance. In some examples, the coherence bandwidth indicates that the change in the amplitude of the frequency domain imbalance over the quantity of SCs is below the threshold.

In some examples, the downlink signal component 740 is capable of, configured to, or operable to support a means for receiving, from the network entity, one or more downlink signals. In some examples, the correction component 745 is capable of, configured to, or operable to support a means for performing a correction of the one or more downlink signals based on the estimation of the frequency domain imbalance.

In some examples, the coherence bandwidth component 730 is capable of, configured to, or operable to support a means for receiving, from the network entity, a second indication to update the coherence bandwidth associated with the network entity, where the second indication includes an offset associated with the coherence bandwidth. In some examples, the estimation component 735 is capable of, configured to, or operable to support a means for performing a second estimation of the frequency domain imbalance based on the offset.

Figure 8:
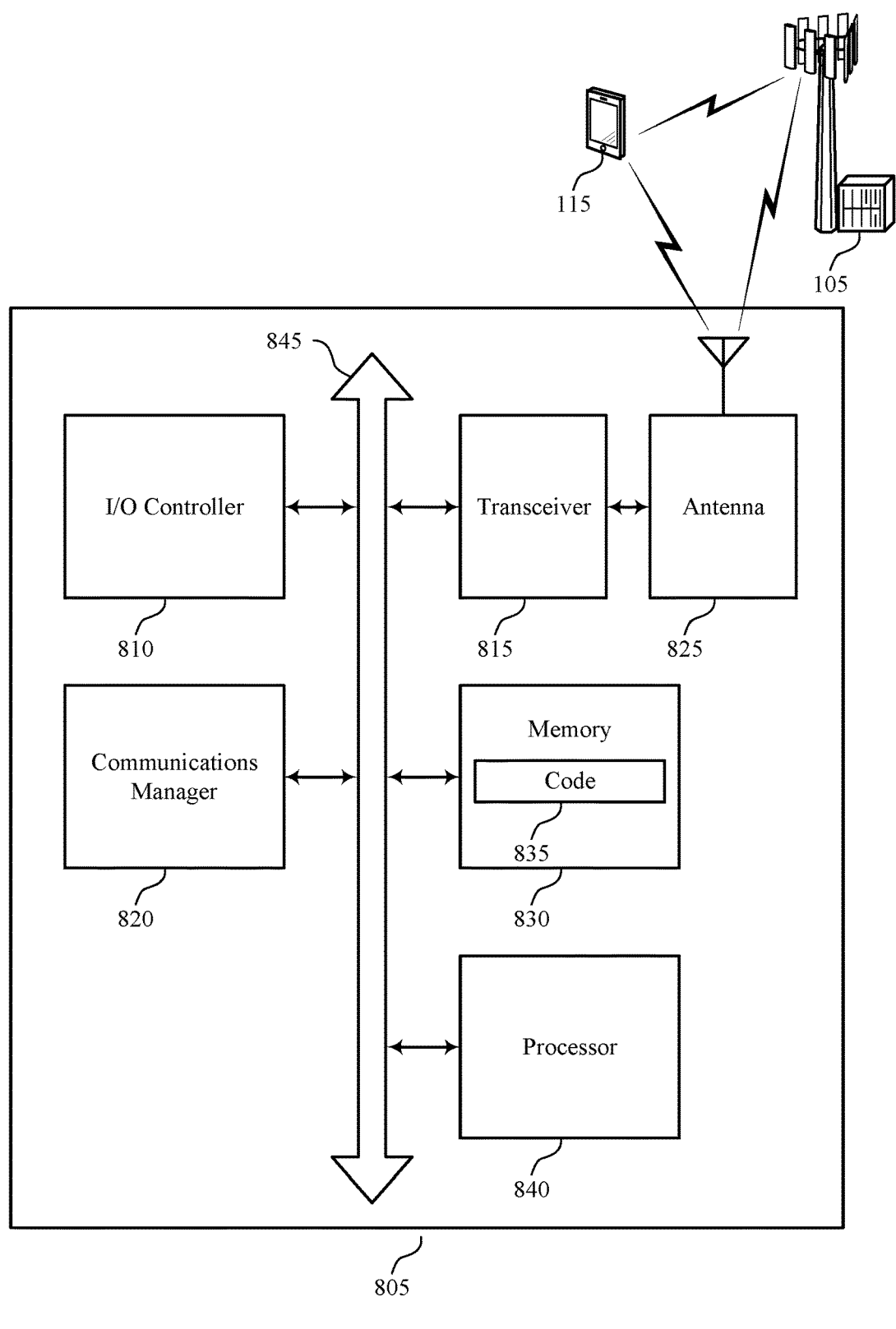
FIG. 8 shows a diagram of a system including a device that supports coherence bandwidth signaling for frequency domain imbalance correction in accordance with one or more aspects of the present disclosure.

FIG. 8 shows a diagram of a system 800 including a device 805 that supports coherence bandwidth signaling for frequency domain imbalance correction in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2R, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting coherence bandwidth signaling for frequency domain imbalance correction). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for transmitting a capability message indicating a capability of the UE to estimate a frequency domain imbalance between an I portion of a transmission chain of a network entity and a Q-phase portion of the transmission chain of the network entity. The communications manager 820 is capable of, configured to, or operable to support a means for receiving, based on the capability message, an indication of a coherence bandwidth associated with the frequency domain imbalance, where the coherence bandwidth indicates a quantity of SCs over which a characteristic of the frequency domain imbalance satisfies a threshold. The communications manager 820 is capable of, configured to, or operable to support a means for performing an estimation of the frequency domain imbalance based on the coherence bandwidth.

By including or configuring the communications manager 820 in accordance with examples as described herein, the device 805 may support techniques for greater flexibility of communication by supporting a greater range of modulation orders, improved communication reliability by reducing errors or EVM associated with signaling between a UE and a network entity, and increased spectral efficiency and system capacity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of coherence bandwidth signaling for frequency domain imbalance correction as described herein, or the at least one processor 840 and the at least one memory 830 may be otherwise configured to, individually or collectively, perform or support such operations.

Figure 9:
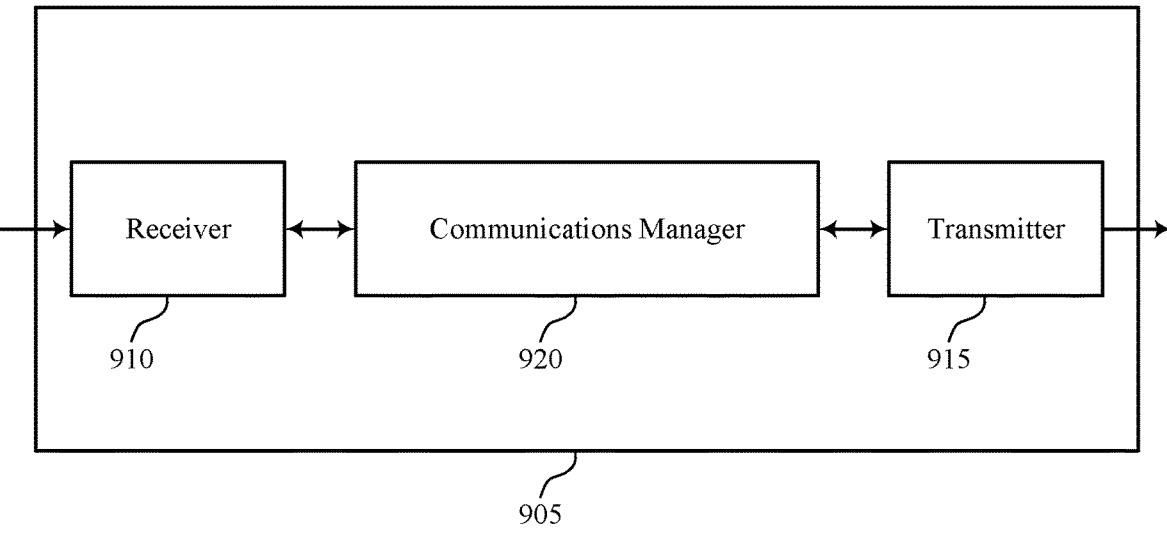
FIGS. 9 and 10 show block diagrams of devices that support coherence bandwidth signaling for frequency domain imbalance correction in accordance with one or more aspects of the present disclosure.

FIG. 9 shows a block diagram 900 of a device 905 that supports coherence bandwidth signaling for frequency domain imbalance correction in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of coherence bandwidth signaling for frequency domain imbalance correction as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for receiving a capability message indicating a capability of a UE to estimate a frequency domain imbalance between an I portion of a transmission chain of the network entity and a Q-phase portion of the transmission chain of the network entity. The communications manager 920 is capable of, configured to, or operable to support a means for transmitting, based on the capability message, an indication of a coherence bandwidth associated with the frequency domain imbalance, where the coherence bandwidth indicates a quantity of SCs over which a characteristic of the frequency domain imbalance satisfies a threshold.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing and reduced power consumption by reducing noise or errors in communication that may be associated with communications between a UE and a network entity and enabling increased modulation orders.

Figure 10:
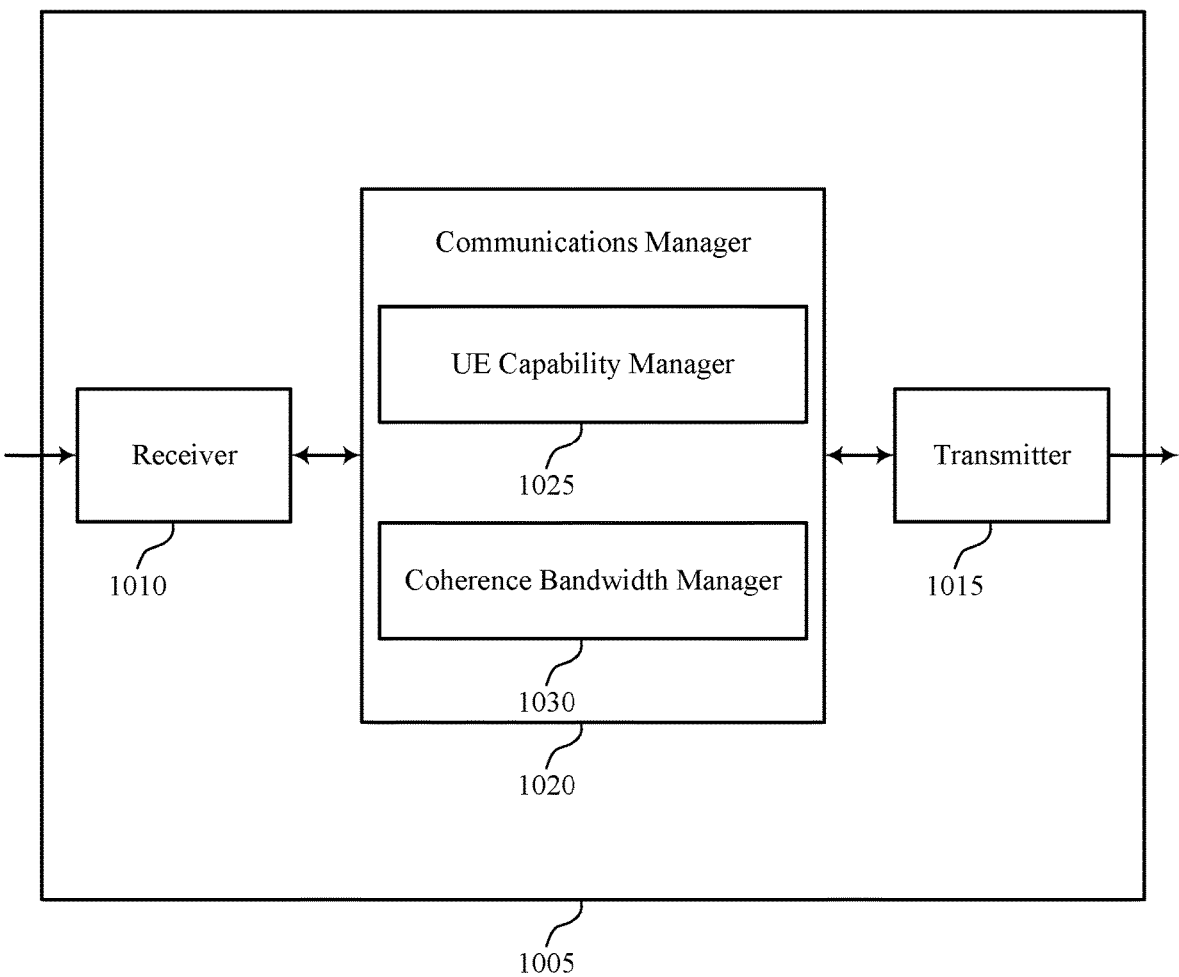

FIG. 10 shows a block diagram 1000 of a device 1005 that supports coherence bandwidth signaling for frequency domain imbalance correction in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of coherence bandwidth signaling for frequency domain imbalance correction as described herein. For example, the communications manager 1020 may include a UE capability manager 1025 a coherence bandwidth manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The UE capability manager 1025 is capable of, configured to, or operable to support a means for receiving a capability message indicating a capability of a UE to estimate a frequency domain imbalance between an I portion of a transmission chain of the network entity and a Q-phase portion of the transmission chain of the network entity. The coherence bandwidth manager 1030 is capable of, configured to, or operable to support a means for transmitting, based on the capability message, an indication of a coherence bandwidth associated with the frequency domain imbalance, where the coherence bandwidth indicates a quantity of SCs over which a characteristic of the frequency domain imbalance satisfies a threshold.

FIG. 11 shows a block diagram 1100 of a communications manager 1120 that supports coherence bandwidth signaling for frequency domain imbalance correction in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of coherence bandwidth signaling for frequency domain imbalance correction as described herein. For example, the communications manager 1120 may include a UE capability manager 1125 a coherence bandwidth manager 1130, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The UE capability manager 1125 is capable of, configured to, or operable to support a means for receiving a capability message indicating a capability of a UE to estimate a frequency domain imbalance between an I portion of a transmission chain of the network entity and a Q-phase portion of the transmission chain of the network entity. The coherence bandwidth manager 1130 is capable of, configured to, or operable to support a means for transmitting, based on the capability message, an indication of a coherence bandwidth associated with the frequency domain imbalance, where the coherence bandwidth indicates a quantity of SCs over which a characteristic of the frequency domain imbalance satisfies a threshold.

In some examples, the coherence bandwidth manager 1130 is capable of, configured to, or operable to support a means for performing one or more measurements associated with a change in amplitude of the frequency domain imbalance. In some examples, the coherence bandwidth manager 1130 is capable of, configured to, or operable to support a means for calculating the coherence bandwidth based on the one or more measurements.

In some examples, the coherence bandwidth manager 1130 is capable of, configured to, or operable to support a means for performing one or more estimations of the frequency domain imbalance using a set of candidate coherence bandwidths that includes at least the coherence bandwidth. In some examples, the coherence bandwidth manager 1130 is capable of, configured to, or operable to support a means for selecting the coherence bandwidth from among the set of candidate coherence bandwidths based on an estimated error associated with the coherence bandwidth.

In some examples, the estimated error is lower than one or more estimated errors associated with one or more other coherence bandwidths of the set of candidate coherence bandwidths.

In some examples, to support transmitting the indication of the coherence bandwidth, the coherence bandwidth manager 1130 is capable of, configured to, or operable to support a means for transmitting the indication via MAC layer signaling, RRC layer signaling, or PHY layer signaling.

In some examples, the indication of the coherence bandwidth further includes an identifier of the network entity.

In some examples, the characteristic includes a change in amplitude of the frequency domain imbalance. In some examples, the coherence bandwidth indicates that the change in the amplitude of the frequency domain imbalance over the quantity of SCs is below the threshold.

In some examples, the coherence bandwidth manager 1130 is capable of, configured to, or operable to support a means for transmitting a second indication to update the coherence bandwidth associated with the network entity, where the second indication includes an offset associated with the coherence bandwidth.

Figure 12:
FIG. 12 shows a diagram of a system including a device that supports coherence bandwidth signaling for frequency domain imbalance correction in accordance with one or more aspects of the present disclosure.

FIG. 12 shows a diagram of a system 1200 including a device 1205 that supports coherence bandwidth signaling for frequency domain imbalance correction in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting coherence bandwidth signaling for frequency domain imbalance correction). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for receiving a capability message indicating a capability of a UE to estimate a frequency domain imbalance between an I portion of a transmission chain of the network entity and a Q-phase portion of the transmission chain of the network entity. The communications manager 1220 is capable of, configured to, or operable to support a means for transmitting, based on the capability message, an indication of a coherence bandwidth associated with the frequency domain imbalance, where the coherence bandwidth indicates a quantity of SCs over which a characteristic of the frequency domain imbalance satisfies a threshold.

By including or configuring the communications manager 1220 in accordance with examples as described herein, the device 1205 may support techniques for greater flexibility of communication by supporting a greater range of modulation orders, improved communication reliability by reducing errors or EVM associated with signaling between a UE and a network entity, and increased spectral efficiency and system capacity.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of coherence bandwidth signaling for frequency domain imbalance correction as described herein, or the at least one processor 1235 and the at least one memory 1225 may be otherwise configured to, individually or collectively, perform or support such operations.

FIG. 13 shows a flowchart illustrating a method 1300 that supports coherence bandwidth signaling for frequency domain imbalance correction in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a capability message indicating a capability of the UE to estimate a frequency domain imbalance between an I portion of a transmission chain of a network entity and a Q-phase portion of the transmission chain of the network entity. The operations of block 1305 may be performed in accordance with examples as disclosed herein. In some examples, aspects of the operations of 1305 may be performed by a UE capability component 725 as described with reference to FIG. 7.

At 1310, the method may include receiving, based on the capability message, an indication of a coherence bandwidth associated with the frequency domain imbalance, where the coherence bandwidth indicates a quantity of SCs over which a characteristic of the frequency domain imbalance satisfies a threshold. The operations of block 1310 may be performed in accordance with examples as disclosed herein. In some examples, aspects of the operations of 1310 may be performed by a coherence bandwidth component 730 as described with reference to FIG. 7.

At 1315, the method may include performing an estimation of the frequency domain imbalance based on the coherence bandwidth. The operations of block 1315 may be performed in accordance with examples as disclosed herein. In some examples, aspects of the operations of 1315 may be performed by an estimation component 735 as described with reference to FIG. 7.

FIG. 14 shows a flowchart illustrating a method 1400 that supports coherence bandwidth signaling for frequency domain imbalance correction in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating a capability of the UE to estimate a frequency domain imbalance between an I portion of a transmission chain of a network entity and a Q-phase portion of the transmission chain of the network entity. The operations of block 1405 may be performed in accordance with examples as disclosed herein. In some examples, aspects of the operations of 1405 may be performed by a UE capability component 725 as described with reference to FIG. 7.

At 1415, the method may include receiving, from the network entity and based on the capability message, a message including an indication of a coherence bandwidth associated with the frequency domain imbalance, where the coherence bandwidth indicates a quantity of subcarriers over which a characteristic of the frequency domain imbalance satisfies a threshold. The operations of block 1415 may be performed in accordance with examples as disclosed herein. In some examples, aspects of the operations of 1415 may be performed by a coherence bandwidth component 730 as described with reference to FIG. 7.

At 1420, the method may include performing an estimation of the frequency domain imbalance based on the coherence bandwidth. The operations of block 1420 may be performed in accordance with examples as disclosed herein. In some examples, aspects of the operations of 1420 may be performed by an estimation component 735 as described with reference to FIG. 7.

At 1425, the method may include receiving, from a second network entity, a second indication of a second coherence bandwidth associated with a second frequency domain imbalance of the second network entity. The operations of block 1425 may be performed in accordance with examples as disclosed herein. In some examples, aspects of the operations of 1425 may be performed by a coherence bandwidth component 730 as described with reference to FIG. 7.

At 1430, the method may include performing a second estimation of the second frequency domain imbalance based on the second coherence bandwidth. The operations of block 1430 may be performed in accordance with examples as disclosed herein. In some examples, aspects of the operations of 1430 may be performed by an estimation component 735 as described with reference to FIG. 7.

FIG. 15 shows a flowchart illustrating a method 1500 that supports coherence bandwidth signaling for frequency domain imbalance correction in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message indicating a capability of the UE to estimate a frequency domain imbalance between an I portion of a transmission chain of a network entity and a Q-phase portion of the transmission chain of the network entity. The operations of block 1505 may be performed in accordance with examples as disclosed herein. In some examples, aspects of the operations of 1505 may be performed by a UE capability component 725 as described with reference to FIG. 7.

At 1510, the method may include receiving, based on the capability message, an indication of a coherence bandwidth associated with the frequency domain imbalance, where the coherence bandwidth indicates a quantity of SCs over which a characteristic of the frequency domain imbalance satisfies a threshold. The operations of block 1510 may be performed in accordance with examples as disclosed herein. In some examples, aspects of the operations of 1510 may be performed by a coherence bandwidth component 730 as described with reference to FIG. 7.

At 1515, the method may include averaging the frequency domain imbalance over the quantity of SCs. The operations of block 1515 may be performed in accordance with examples as disclosed herein. In some examples, aspects of the operations of 1515 may be performed by an estimation component 735 as described with reference to FIG. 7.

At 1520, the method may include performing an estimation of the frequency domain imbalance based on the coherence bandwidth, where the estimation of the frequency domain imbalance is based on the averaging. The operations of block 1520 may be performed in accordance with examples as disclosed herein. In some examples, aspects of the operations of 1520 may be performed by an estimation component 735 as described with reference to FIG. 7.

FIG. 16 shows a flowchart illustrating a method 1600 that supports coherence bandwidth signaling for frequency domain imbalance correction in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a capability message indicating a capability of a UE to estimate a frequency domain imbalance between an I portion of a transmission chain of the network entity and a Q-phase portion of the transmission chain of the network entity. The operations of block 1605 may be performed in accordance with examples as disclosed herein. In some examples, aspects of the operations of 1605 may be performed by a UE capability manager 1125 as described with reference to FIG. 11.

At 1610, the method may include transmitting, based on the capability message, an indication of a coherence bandwidth associated with the frequency domain imbalance, where the coherence bandwidth indicates a quantity of SCs over which a characteristic of the frequency domain imbalance satisfies a threshold. The operations of block 1610 may be performed in accordance with examples as disclosed herein. In some examples, aspects of the operations of 1610 may be performed by a coherence bandwidth manager 1130 as described with reference to FIG. 11.

Figure 17:
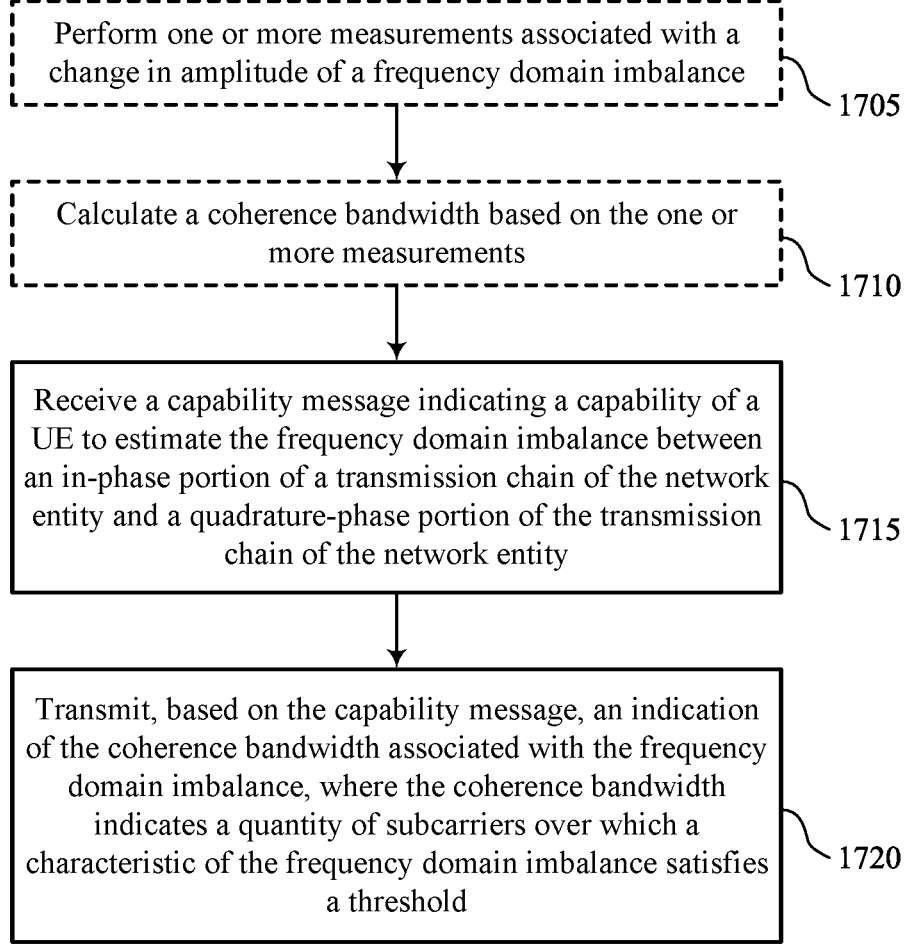

FIG. 17 shows a flowchart illustrating a method 1700 that supports coherence bandwidth signaling for frequency domain imbalance correction in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include performing one or more measurements associated with a change in amplitude of a frequency domain imbalance. The operations of block 1705 may be performed in accordance with examples as disclosed herein. In some examples, aspects of the operations of 1705 may be performed by a coherence bandwidth manager 1130 as described with reference to FIG. 11.

At 1710, the method may include calculating a coherence bandwidth based on the one or more measurements. The operations of block 1710 may be performed in accordance with examples as disclosed herein. In some examples, aspects of the operations of 1710 may be performed by a coherence bandwidth manager 1130 as described with reference to FIG. 11.

At 1715, the method may include receiving a capability message indicating a capability of a UE to estimate the frequency domain imbalance between an I portion of a transmission chain of the network entity and a Q-phase portion of the transmission chain of the network entity. The operations of block 1715 may be performed in accordance with examples as disclosed herein. In some examples, aspects of the operations of 1715 may be performed by a UE capability manager 1125 as described with reference to FIG. 11.

At 1720, the method may include transmitting, based on the capability message, an indication of the coherence bandwidth associated with the frequency domain imbalance, where the coherence bandwidth indicates a quantity of SCs over which a characteristic of the frequency domain imbalance satisfies a threshold. The operations of block 1720 may be performed in accordance with examples as disclosed herein. In some examples, aspects of the operations of 1720 may be performed by a coherence bandwidth manager 1130 as described with reference to FIG. 11.

The following provides an overview of aspects of the present disclosure:

Aspect 1: A method for wireless communication by a UE, comprising: transmitting a capability message indicating a capability of the UE to estimate a frequency domain imbalance between an I portion of a transmission chain of a network entity and a Q portion of the transmission chain of the network entity: receiving, based at least in part on the capability message, an indication of a coherence bandwidth associated with the frequency domain imbalance, wherein the coherence bandwidth indicates a quantity of SCs over which a characteristic of the frequency domain imbalance satisfies a threshold; and performing an estimation of the frequency domain imbalance based at least in part on the coherence bandwidth.

Aspect 2: The method of aspect 1, wherein receiving the indication of the coherence bandwidth comprises: receiving, from the network entity, a message comprising the indication of the coherence bandwidth.

Aspect 3: The method of aspect 2, further comprising: receiving, from a second network entity, a second indication of a second coherence bandwidth associated with a second frequency domain imbalance of the second network entity; and performing a second estimation of the second frequency domain imbalance based at least in part on the second coherence bandwidth.

Aspect 4: The method of any of aspects 2 through 3, wherein receiving the message comprises: receiving the message via MAC layer signaling, RRC layer signaling, or PHY layer signaling.

Aspect 5: The method of any of aspects 1 through 4, wherein performing the estimation of the frequency domain imbalance further comprises: averaging the frequency domain imbalance over the quantity of SCs, wherein the estimation of the frequency domain imbalance is based at least in part on the averaging.

Aspect 6: The method of any of aspects 1 through 5, wherein the characteristic comprises a change in amplitude of the frequency domain imbalance, and the coherence bandwidth indicates that the change in the amplitude of the frequency domain imbalance over the quantity of SCs is below the threshold.

Aspect 7: The method of any of aspects 1 through 6, further comprising: receiving, from the network entity, one or more downlink signals; and performing a correction of the one or more downlink signals based at least in part on the estimation of the frequency domain imbalance.

Aspect 8: The method of any of aspects 1 through 7, further comprising: receiving, from a network entity, a second indication to update the coherence bandwidth associated with the network entity, wherein the second indication comprises an offset associated with the coherence bandwidth; and performing a second estimation of the frequency domain imbalance based at least in part on the offset.

Aspect 9: A method for wireless communication by a network entity, comprising: receiving a capability message indicating a capability of a UE to estimate a frequency domain imbalance between an I portion of a transmission chain of the network entity and a Q portion of the transmission chain of the network entity; and transmitting, based at least in part on the capability message, an indication of a coherence bandwidth associated with the frequency domain imbalance, wherein the coherence bandwidth indicates a quantity of SCs over which a characteristic of the frequency domain imbalance satisfies a threshold.

Aspect 10: The method of aspect 9, further comprising: performing one or more measurements associated with a change in amplitude of the frequency domain imbalance; and calculating the coherence bandwidth based at least in part on the one or more measurements.

Aspect 11: The method of any of aspects 9 through 10, further comprising: performing one or more estimations of the frequency domain imbalance using a set of candidate coherence bandwidths that includes at least the coherence bandwidth; and selecting the coherence bandwidth from among the set of candidate coherence bandwidths based at least in part on an estimated error associated with the coherence bandwidth.

Aspect 12: The method of aspect 11, wherein the estimated error is lower than one or more estimated errors associated with one or more other coherence bandwidths of the set of candidate coherence bandwidths.

Aspect 13: The method of any of aspects 9 through 12, wherein transmitting the indication of the coherence bandwidth comprises: transmitting the indication via MAC layer signaling, RRC layer signaling, or PHY layer signaling.

Aspect 14: The method of any of aspects 9 through 13, wherein the indication of the coherence bandwidth further comprises an identifier of the network entity.

Aspect 15: The method of any of aspects 9 through 14, wherein the characteristic comprises a change in amplitude of the frequency domain imbalance, and the coherence bandwidth indicates that the change in the amplitude of the frequency domain imbalance over the quantity of SCs is below the threshold.

Aspect 16: The method of any of aspects 9 through 15, further comprising: transmitting a second indication to update the coherence bandwidth associated with the network entity, wherein the second indication comprises an offset associated with the coherence bandwidth.

Aspect 17: A UE for wireless communication, comprising one or more memories storing processor-executable code, and one or more processors coupled with the one or more memories and individually or collectively are operable to execute the code to cause the UE to perform a method of any of aspects 1 through 8.

Aspect 18: A UE for wireless communication, comprising at least one means for performing a method of any of aspects 1 through 8.

Aspect 19: A non-transitory computer-readable medium storing code for wireless communication, the code comprising instructions executable by one or more processors to perform a method of any of aspects 1 through 8.

Aspect 20: A network entity for wireless communication, comprising one or more memories storing processor-executable code, and one or more processors coupled with the one or more memories and individually or collectively operable to execute the code to cause the network entity to perform a method of any of aspects 9 through 16.

Aspect 21: A network entity for wireless communication, comprising at least one means for performing a method of any of aspects 9 through 16.

Aspect 22: A non-transitory computer-readable medium storing code for wireless communication, the code comprising instructions executable by one or more processors to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   transmit a capability message indicating a capability of the UE to estimate a frequency domain imbalance between an in-phase portion of a transmission chain of a network entity and a quadrature-phase portion of the transmission chain of the network entity;
   receive, based at least in part on the capability message, an indication of a coherence bandwidth associated with the frequency domain imbalance, wherein the coherence bandwidth indicates a quantity of subcarriers over which a change in amplitude of the frequency domain imbalance is below a threshold; and
   perform an estimation of the frequency domain imbalance based at least in part on the coherence bandwidth.

2. The UE of claim 1, wherein, to receive the indication of the coherence bandwidth, the one or more processors are individually or collectively operable to execute the code to cause the UE to:
   receive, from the network entity, a message comprising the indication of the coherence bandwidth.

3. The UE of claim 2, wherein the one or more processors are individually or collectively further operable to execute the code to cause the UE to:
   receive, from a second network entity, a second indication of a second coherence bandwidth associated with a second frequency domain imbalance of the second network entity; and
   perform a second estimation of the second frequency domain imbalance based at least in part on the second coherence bandwidth.

4. The UE of claim 2, wherein, to receive the message, the one or more processors are individually or collectively operable to execute the code to cause the UE to:
   receive the message via medium access control layer signaling, radio resource control layer signaling, or physical layer signaling.

5. The UE of claim 1, wherein, to perform the estimation of the frequency domain imbalance, the one or more processors are individually or collectively further operable to execute the code to cause the UE to:

average the frequency domain imbalance over the quantity of subcarriers, wherein the estimation of the frequency domain imbalance is based at least in part on the averaging.

6. The UE of claim 1, wherein the one or more processors are individually or collectively further operable to execute the code to cause the UE to:

receive, from the network entity, one or more downlink signals; and perform a correction of the one or more downlink signals based at least in part on the estimation of the frequency domain imbalance.

7. The UE of claim 1, wherein the one or more processors are individually or collectively further operable to execute the code to cause the UE to:

receive, from the network entity, a second indication to update the coherence bandwidth associated with the network entity, wherein the second indication comprises an offset associated with the coherence bandwidth; and perform a second estimation of the frequency domain imbalance based at least in part on the offset.

8. A network entity, comprising:

one or more memories storing processor-executable code; and one or more processors coupled with the one or more memories and individually or collectively operable to execute the code to cause the network entity to:

receive a capability message indicating a capability of a user equipment (UE) to estimate a frequency domain imbalance between an in-phase portion of a transmission chain of the network entity and a quadrature-phase portion of the transmission chain of the network entity; and transmit, based at least in part on the capability message, an indication of a coherence bandwidth associated with the frequency domain imbalance, wherein the coherence bandwidth indicates a quantity of subcarriers over which a change in amplitude of the frequency domain imbalance is below a threshold.

9. The network entity of claim 8, wherein the one or more processors are individually or collectively further operable to execute the code to cause the network entity to:

perform one or more measurements associated with the change in amplitude of the frequency domain imbalance; and calculate the coherence bandwidth based at least in part on the one or more measurements.

10. The network entity of claim 8, wherein the one or more processors are individually or collectively further operable to execute the code to cause the network entity to:

perform one or more estimations of the frequency domain imbalance using a set of candidate coherence bandwidths that includes at least the coherence bandwidth; and select the coherence bandwidth from among the set of candidate coherence bandwidths based at least in part on an estimated error associated with the coherence bandwidth.

11. The network entity of claim 10, wherein the estimated error is lower than one or more estimated errors associated with one or more other coherence bandwidths of the set of candidate coherence bandwidths.

12. The network entity of claim 8, wherein, to transmit the indication of the coherence bandwidth, the one or more processors are individually or collectively operable to execute the code to cause the network entity to:

transmit the indication via medium access control layer signaling, radio resource control layer signaling, or physical layer signaling.

13. The network entity of claim 8, wherein the indication of the coherence bandwidth further comprises an identifier of the network entity.

14. A method for wireless communication by a user equipment (UE), comprising:

transmitting a capability message indicating a capability of the UE to estimate a frequency domain imbalance between an in-phase portion of a transmission chain of a network entity and a quadrature-phase portion of the transmission chain of the network entity;

receiving, based at least in part on the capability message, an indication of a coherence bandwidth associated with the frequency domain imbalance, wherein the coherence bandwidth indicates a quantity of subcarriers over which a change in amplitude of the frequency domain imbalance is below a threshold; and performing an estimation of the frequency domain imbalance based at least in part on the coherence bandwidth.

15. The method of claim 14, wherein receiving the indication of the coherence bandwidth comprises:

receiving, from the network entity, a message comprising the indication of the coherence bandwidth.

16. The method of claim 15, further comprising:

receiving, from a second network entity, a second indication of a second coherence bandwidth associated with a second frequency domain imbalance of the second network entity; and performing a second estimation of the second frequency domain imbalance based at least in part on the second coherence bandwidth.

17. The method of claim 15, wherein receiving the message comprises:

receiving the message via medium access control layer signaling, radio resource control layer signaling, or physical layer signaling.

18. The method of claim 14, wherein performing the estimation of the frequency domain imbalance further comprises:

averaging the frequency domain imbalance over the quantity of subcarriers, wherein the estimation of the frequency domain imbalance is based at least in part on the averaging.

19. The method of claim 14, further comprising:

receiving, from the network entity, one or more downlink signals; and performing a correction of the one or more downlink signals based at least in part on the estimation of the frequency domain imbalance.

20. The method of claim 14, further comprising:

receiving, from the network entity, a second indication to update the coherence bandwidth associated with the network entity, wherein the second indication comprises an offset associated with the coherence bandwidth; and performing a second estimation of the frequency domain imbalance based at least in part on the offset.

21. A method for wireless communication by a network entity, comprising:

receiving a capability message indicating a capability of a user equipment (UE) to estimate a frequency domain imbalance between an in-phase portion of a transmission chain of the network entity and a quadrature-phase portion of the transmission chain of the network entity; and transmitting, based at least in part on the capability message, an indication of a coherence bandwidth associated with the frequency domain imbalance, wherein the coherence bandwidth indicates a quantity of subcarriers over which a change in amplitude of the frequency domain imbalance is below a threshold.

22. The method of claim 21, further comprising:

performing one or more measurements associated with the change in amplitude of the frequency domain imbalance; and calculating the coherence bandwidth based at least in part on the one or more measurements.

23. The method of claim 21, further comprising:

performing one or more estimations of the frequency domain imbalance using a set of candidate coherence bandwidths that includes at least the coherence bandwidth; and selecting the coherence bandwidth from among the set of candidate coherence bandwidths based at least in part on an estimated error associated with the coherence bandwidth.

24. The method of claim 23, wherein the estimated error is lower than one or more estimated errors associated with one or more other coherence bandwidths of the set of candidate coherence bandwidths.

25. The method of claim 21, wherein transmitting the indication of the coherence bandwidth comprises:

transmitting the indication via medium access control layer signaling, radio resource control layer signaling, or physical layer signaling.

26. The method of claim 21, wherein the indication of the coherence bandwidth further comprises an identifier of the network entity.

\* \* \* \* \*